(12) United States Patent
Hirade et al.

(10) Patent No.: US 8,667,243 B2
(45) Date of Patent: Mar. 4, 2014

(54) STORAGE APPARATUS, CONTROLLER, AND METHOD OF CONTROLLING CONTROLLER

(75) Inventors: Takeshi Hirade, Kahoku (JP); Joichi Bita, Kahoku (JP); Masayoshi Mizumaki, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 13/364,943

(22) Filed: Feb. 2, 2012

(65) Prior Publication Data

US 2012/0272023 A1    Oct. 25, 2012

(30) Foreign Application Priority Data

Apr. 19, 2011  (JP) .................................. 2011-092989

(51) Int. Cl.
   *G06F 12/00* (2006.01)
(52) U.S. Cl.
   USPC ........................................... 711/163; 710/17
(58) Field of Classification Search
   USPC ........................................... 711/163; 710/17
   See application file for complete search history.

(56) References Cited

U.S. PATENT DOCUMENTS

| | | | |
|---|---|---|---|
| 7,103,712 B2* | 9/2006 | Mizuno | 711/112 |
| 7,263,584 B2* | 8/2007 | Nakayama et al. | 711/114 |
| 8,099,547 B2 | 1/2012 | Amano et al. | |
| 2003/0177174 A1* | 9/2003 | Allen et al. | 709/203 |
| 2004/0049572 A1* | 3/2004 | Yamamoto et al. | 709/224 |
| 2006/0112220 A1* | 5/2006 | Otsuka et al. | 711/114 |
| 2007/0005885 A1* | 1/2007 | Kobayashi et al. | 711/114 |
| 2010/0106822 A1* | 4/2010 | Nagai et al. | 709/224 |

FOREIGN PATENT DOCUMENTS

| | | |
|---|---|---|
| JP | 8-221290 | 8/1996 |
| JP | 9-198195 | 7/1997 |
| JP | 2002-158579 | 5/2002 |
| JP | 2004-192305 | 7/2004 |
| JP | 2009-48530 | 3/2009 |
| JP | 2010-79626 | 4/2010 |

\* cited by examiner

*Primary Examiner* — Charles Rones
*Assistant Examiner* — Mohammed Haque
(74) *Attorney, Agent, or Firm* — Fujitsu Patent Center

(57) ABSTRACT

Provided are a processor generates second notification information by copying first notification information including target information about all communication adaptors in a storage apparatus; updates the first notification information, upon configuration information on the communication adaptors being modified; updates, when receiving a target information obtainment request, the second notification information with second notification information; blocks, when a predetermined copy prevention condition is met, copy of the first notification information to the second notification information; and sends, when receiving the target information obtainment request, the second notification information to the host apparatus, thereby, the load for notifying notification information to the host apparatus can be reduced, as well as preventing any inconsistency in notifying the notification information.

9 Claims, 25 Drawing Sheets

STORAGE APPARATUS, CONTROLLER, AND METHOD OF CONTROLLING CONTROLLER

CROSS-REFERENCE TO RELATED APPLICATION

This application is based upon and claims the benefit of priority of the prior Japanese Patent Application No. 2011-092989, filed on Apr. 19, 2011, the entire contents of which are incorporated herein by reference.

FIELD

The embodiments discussed herein are related to a storage apparatus, a controller, and a method of controlling a controller.

BACKGROUND

In a discover session of the iSCSI (Internet Small Computer System Interface), a host apparatus obtains information on a target apparatus to be accessed (target information) using the SendTargets command of the iSCSI interface (refer to Japanese Laid-open Patent Publication No. 2010-79626). It should be noted that the iSCSI standard and the like is defined in the RFC 3720.

The target information specifically includes the iSCSI Names, the IP addresses, the TCP port information, and the Target Portal Group Numbers of CA (channel adapter) ports in a target apparatus. It should be noted that the Target Portal Group Numbers are logical numbers of the respective CA ports and are arbitrarily set to the respective ports. For example, a different value may be set for each CA, or a single value may be set to two or more CAs for handling these CAs as a single group. A target apparatus is an RAID (redundant arrays of inexpensive disks) apparatus, for example.

An RAID apparatus provides redundancy by including multiple CMs (controller modules), for example, wherein each CM includes one or more CAs (channel adapters).

FIG. 23 is a diagram schematically illustrating a configuration of a conventional storage apparatus; An RAID apparatus 500 is connected to a host apparatus 510 via a communication network 511, and provides the host apparatus 510 with storage regions.

In the example depicted in FIG. 23, the storage apparatus 500 includes two CMs, i.e., a CM 0 and a CM 1. The CM 0 includes a CA 0 and a CA 1 and the CM 1 includes a CA 2 and a CA 3.

The CM 0 includes CA information 501-0, and the CM 1 includes CA information 501-1. The CA information 501-0 includes target information on the CA 0 and the CA 1 in the CM 0, and the CA information 501-1 includes target information on the CA 2 and the CA 3 in the CM 1.

In other words, in the RAID apparatus 500, a CM contains target information about one or more CAs provided in that local CM, and the target information is sent in response to a request (SendTargets) from the host apparatus 510.

For example, if a SendTargets command is sent from the host apparatus 510 to the CA 0 in the CM 0, the CM 0 that receives the SendTargets command notifies the host apparatus of the target information about the CA 0 that received the command.

PATENT DOCUMENT

Patent Reference 1: Japanese Laid-open Patent Publication No. 2010-79626

In recent years, it becomes desirable that in an RAID apparatus, when a request for target information is made from a host apparatus using a SendTargets command, target information about all CAports in the RAID apparatus is notified the host apparatus by the CM that receives the SendTargets command.

However, in a conventional RAID apparatus as the one described above, since a CM only includes target information on CAs in the local CM, target information about all CA ports in the RAID apparatus cannot be notified promptly, in response to a request from the host apparatus.

Here, let's assume a case wherein CMs provided in an RAID apparatus include target information on other CMs in that RAID apparatus.

FIG. 24 is a diagram schematically illustrating a hardware configuration of an RAID apparatus, wherein each of CM 0 and CM 1 includes target information on all of CAs, i.e., CA 0 to CA 3, in an RAID apparatus 500a. The reference symbols that have been described above refer to the same or substantially the same portions referenced to in the foregoing drawings, and their (detailed) description will be omitted.

In the example depicted in FIG. 24, a CM 0 includes CA information 501a-0 and a CM 1 includes CA information 501a-1. The CA information 501a-0 and 501a-1 respectively includes target information on a CA 0 and a CA 1 in the CM 0 and target information on a CA 2 and a CA 3 in the CM 1. In other words, the CA information 501a-0 and 501a-1 includes the target information on all of the CA 0 to CA 3 in the RAID apparatus 500a.

In the example as depicted in FIG. 24, if the configuration of a CA in any CM is modified, for example, the target information 501a-0 and the target information 501a-1 would be synchronized by sending information about the modified configuration from the modified CM to the other CM. As a result, in principle, the target information 501a-0 becomes identical to the target information 501a-1.

Note that the reference symbols 501a-0 and 501a-1 are used hereinafter when reference is made to specific target information while reference symbol 501a is used when reference is made to any of the target information.

In the meantime, the data size of target information 501a including information about all of the CAs in the RAID apparatus 500a is increased, and accordingly, the data size of notification data as a response to a SendTargets command from the host apparatus is also increased. For sending target information 501a having such a large data size from the RAID apparatus 500a to the host apparatus 510, divided target information is generated by dividing the target information 501a into two or more pieces, and the divided pieces of target information are sent, one by one.

However, in the RAID apparatus 500a, while divided pieces of target information 501a are being sent, the configuration of a CA in any CM may be modified after some pieces of target information is sent, before transmission of the rest of divided target information.

FIG. 25 is a diagram illustrating the situation wherein a configuration is modified in an RAID apparatus during a division transmission of target information.

FIG. 25 illustrates the example wherein target information 501a is divided into two pieces of divided target information and are sent. The information on the CA 0 and the CA 1 is sent in one of the pieces of divide target (1/2), and the information on the CA 2 and the CA 3 is sent in the other piece of divide target (2/2).

When a SendTargets command is sent from the host apparatus 510 to the RAID apparatus 500a, the divided target information (1/2) is sent first from the RAID apparatus 500a, followed by the divided target information (2/2).

Here, after the divided target information (1/2) was sent, the target information is modified in the RAID apparatus 500a before transmission of the divided target information (2/2).

For example, among the Target Portal Group Numbers of the CA 0, the CA 1, the CA 2, and the CA 3 of "10", "11", "12", and "13", the Target Portal Group Numbers for the CA 0 and the CA 2 are modified to "20".

In such a case, the divided target information (1/2) includes the information on the CA 1 and the information on the CA 0 before the update, and the divided target information (2/2) includes the information on the CA 3 and the information on the CA 2 after the updated.

Thus, an inconsistency arises between the target information received by the host apparatus 510 and the actual configuration of the RAID apparatus 500a, and the host apparatus 510 may encounter some error due to the inconsistency.

SUMMARY

Accordingly, the present storage apparatus is a storage apparatus including a storage that is capable of storing data and a plurality of communication adaptors capable of being connected to a host apparatus, the storage apparatus including: a first notification information storing section that stores first notification information including target information about all of the communication adaptors in the storage apparatus; a second notification information generation section that generates second notification information by copying the first notification information; a second notification information storing section that stores the second notification information generated by the second notification information generation section; a first notification information updating section that updates the first notification information stored in the first notification information storing section, upon configuration information on the communication adaptors being modified; a second notification information updating section that updates, in response to receiving a target information obtainment request from the host apparatus, the second notification information stored in the second notification information storing section with second notification information generated by copying the first notification information; a copy prevention determination section that determines whether a status of the storage apparatus meets a predetermined copy prevention condition; a copy prevention section that blocks, when the copy prevention determination section determines that the status of the storage apparatus matches the predetermined copy prevention condition, the copy of the first notification information to the second notification information by the second notification information generation section; and a notification information transmission section that sends, in response to receiving the target information obtainment request from the host apparatus, the second notification information stored in the second notification information storing section to the host apparatus.

In addition, the present controller is a controller including one or more communication adaptors capable of being connected to a host apparatus and capable of connected to a storage that is capable of storing data, the controller including: a first notification information storing section that stores first notification information including target information about all of the communication adaptors in the storage apparatus; a second notification information generation section that generates second notification information by copying the first notification information; a second notification information storing section that stores the second notification information generated by the second notification information generation section; a first notification information updating section that updates the first notification information stored in the first notification information storing section, upon configuration information on the communication adaptors being modified; a second notification information updating section that updates, in response to receiving a target information obtainment request from the host apparatus, the second notification information stored in the second notification information storing section with second notification information generated by copying the first notification information; a copy prevention determination section that determines whether a status of the storage apparatus meets a predetermined copy prevention condition; a copy prevention section that blocks, when the copy prevention determination section determines that the status of the storage apparatus matches the predetermined copy prevention condition, the copy of the first notification information to the second notification information by the second notification information generation section; and a notification information transmission section that sends, in response to receiving the target information obtainment request from the host apparatus, the second notification information stored in the second notification information storing section to the host apparatus.

Further, the present method of controlling a controller is a method of controlling a controller including one or more communication adaptors capable of being connected to a host apparatus and capable of connected to a storage that is capable of storing data, the method including: storing first notification information including target information about all of the communication adaptors in the storage apparatus in a first notification information storing section; generating second notification information by copying the first notification information; storing the second notification information in a second notification information storing section; updating the first notification information stored in the first notification information storing section, upon configuration information on the communication adaptors being modified; updating, in response to receiving a target information obtainment request from the host apparatus, the second notification information stored in the second notification information storing section with second notification information generated by copying the first notification information; determining whether a status of the storage apparatus meets a predetermined copy prevention condition; blocking, when it is determined that the copy prevention condition is met, the copy of the first notification information to the second notification information; and sending, in response to receiving the target information obtainment request from the host apparatus, the second notification information stored in the second notification information storing section to the host apparatus.

Further, the present storage apparatus is a storage apparatus including a plurality of controllers including one or more communication adaptors capable of being connected to a host apparatus, and a storage that is capable of storing data, the storage apparatus including: a notification information storing section that stores notification information including target information about all of the communication adaptors in the storage apparatus; an updating section that updates, in response to receiving modification information about the communication adaptors from another controller, the notification information stored in the notification information storing section, using the received modification information; and a notification information transmission section that sends, in response to receiving a target information obtainment request from the host apparatus, the notification information stored in the notification information storing section to the host apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Hereinafter, embodiments of a storage apparatus, a controller, and a method of controlling a controller will be described with reference to the drawings. Note that embodiments below are described by way of example only, and various modifications and applications of techniques that are not shown explicitly in the embodiments illustrated below are not intended to be excluded. That is, the present embodiments can be practiced in various ways (by combining the embodiments and the modifications, for example) without departing from the spirit thereof.

(A) Description of First Embodiment

Figure 1:
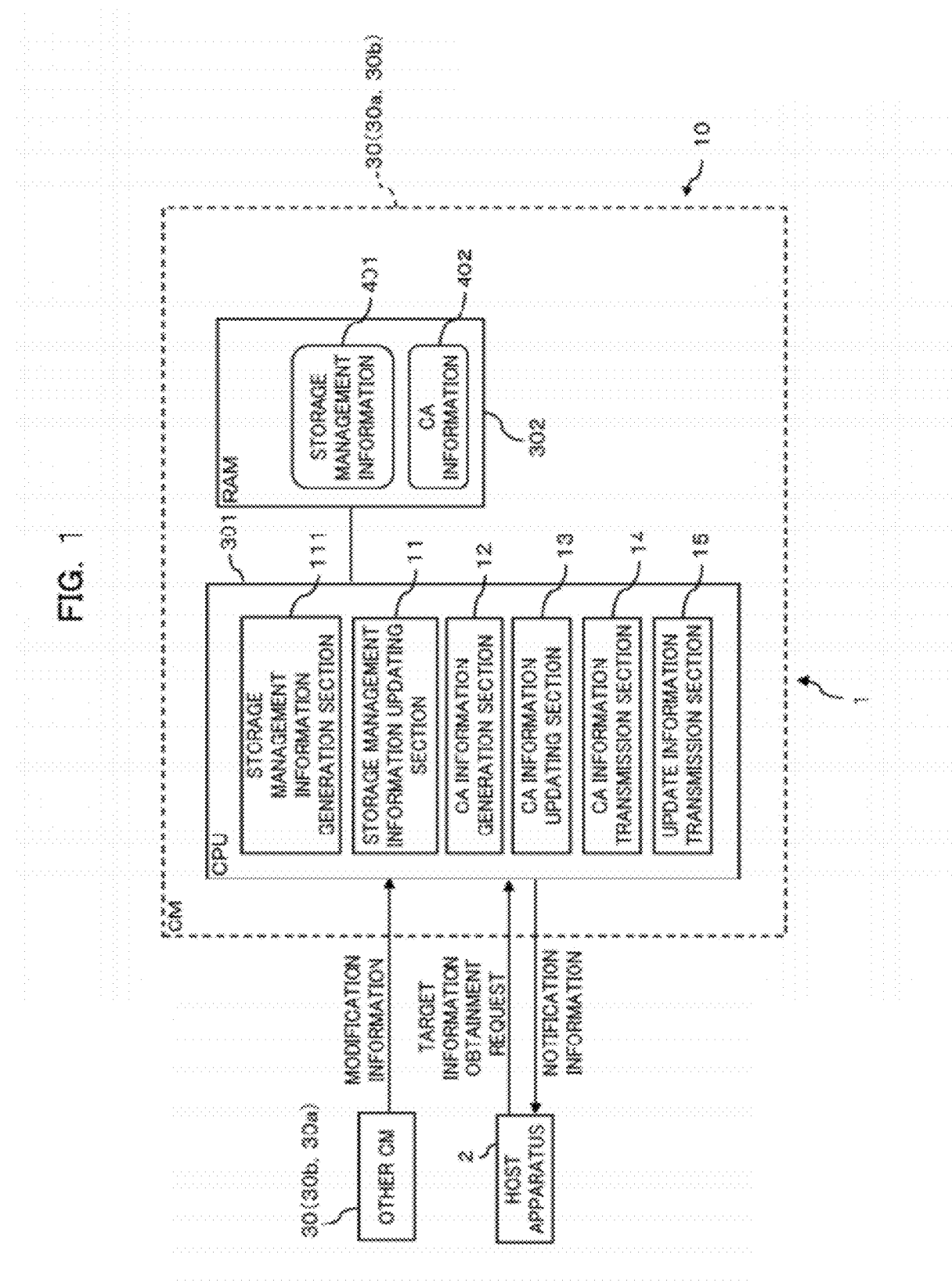
FIG. 1 is a diagram schematically illustrating a functional configuration of a CM provided in a storage system as one example of a first embodiment.
Figure 2:
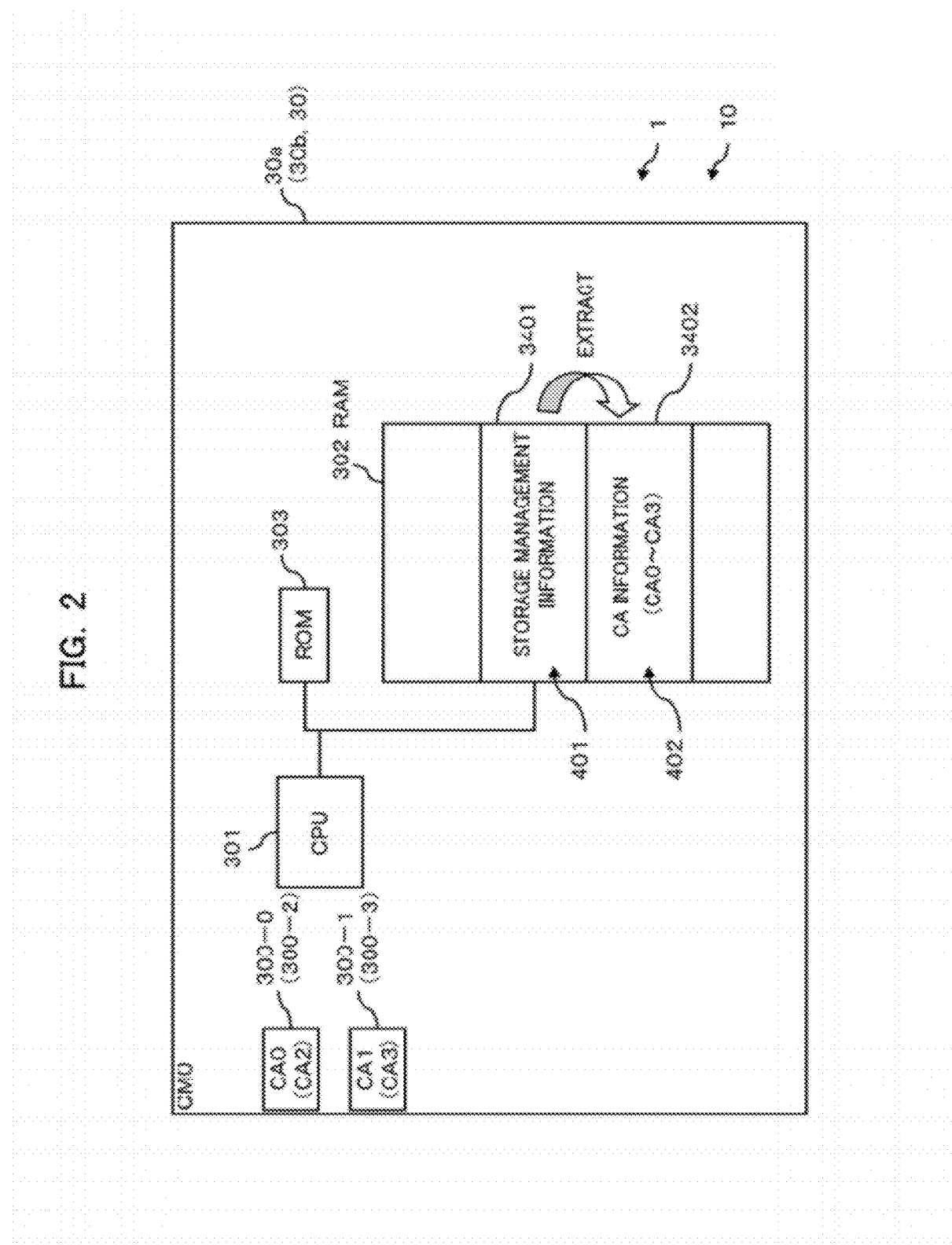
FIG. 2 is a diagram schematically illustrating a hardware configuration of a CM provided in the storage system as one example of the first embodiment.
Figure 3:
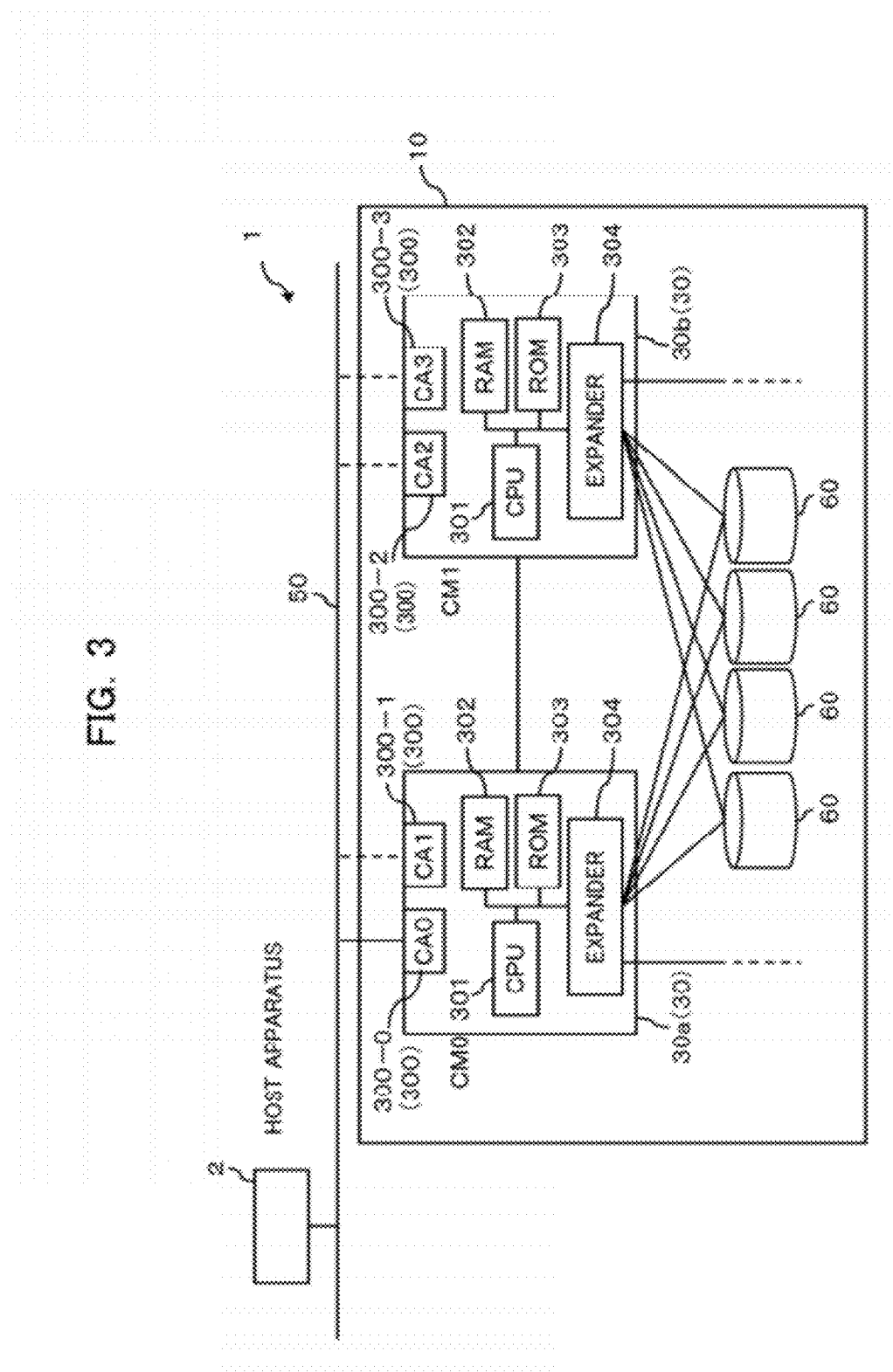
FIG. 3 is a diagram schematically illustrating a hardware configuration of a storage system as one example of the first embodiment.

FIG. 1 is a diagram schematically illustrating an example of a functional configuration of a CM provided in a storage system 1 as one example of a first embodiment, and FIG. 2 is a diagram schematically illustrating an example of a hardware configuration thereof. FIG. 3 is a diagram schematically illustrating a hardware configuration of the CM provided in the storage system 1 as one example of the first embodiment.

As depicted in FIG. 3, the storage system 1 of the present first embodiment includes a storage apparatus 10 and is communicably connected to one or more (one in the example depicted in FIG. 1) host apparatus 2. In this storage system 1, the host apparatus 2 and the storage apparatus 10 are connected to each other by means of the iSCSI.

The host apparatus 2 is a computer (information processing apparatus) having server functions, for example, and sends and receives various types of data, such as SCSI commands and responses, to and from the storage apparatus 10, by means of TCP/IP. The host apparatus 2 writes and reads data to and from storage regions provided by the storage apparatus 10, by sending disk access commands, such as read and write commands, to the storage apparatus 10.

The host apparatus 2 also sends the storage apparatus 10 a target information obtainment request to obtain information about all of CAs 300 (which will be described later) provided in that storage apparatus 10 (target information).

A target information obtainment request is implemented by the SendTargets command of the iSCSI, for example, and an obtainment request for target information about all of the CAs 300 in the storage apparatus 10 may be made by specifying the option "all", for example.

Although the present embodiment will be described hereinafter using the SendTargets command as one example of a target information obtainment request, it should be noted that a target information obtainment request is not limited to the SendTargets command and various modification may be made.

An obtainment request for target information about all of CAs 300 (which will be described later) in the storage apparatus 10 is made during a discovery session upon establishing connection with the storage apparatus 10, for example, or at some other certain timing.

The storage apparatus 10 provides the host apparatus 2 with storage regions, and is communicably connected to the host apparatus 2 via a communication network 50.

As depicted in FIG. 3, the storage apparatus 10 includes controller modules (hereinafter, referred to as CMs) 30a and 30b and HDDs (hard disk drives; storages) 60.

The storage apparatus 10 is connected to the host apparatus 2 and is also connected to a drive enclosure (not illustrated) and the like.

The HDDs 60 are storages to store data such that the data can be read and written, and function as storage sections capable of storing data received from the host apparatus 2. Although the storage apparatus 10 is illustrated to include four HDDs 60 in FIG. 3 for the sake of illustration, this is not limiting and more or less HDDs 60 may be provided. The storage apparatus 10 may be an RAID (redundant arrays of inexpensive disks) apparatus wherein the multiple HDDs 60 are collectively managed as a single storage providing redundancy.

The CMs 30a and 30b are controllers that control operations in the storage apparatus 10, and receive commands, such as read and write commands, from the host apparatus 2 to execute various types of controls. The CM 30a is connected to the network via the CAs 300-0 and 300-1, and the CM 30b is connected to the network via the CAs 300-2 and 300-3. The CMs 30a and 30b receive commands, such as read and write commands, sent from the host apparatus 2, and control the HDDs 60 through expanders 304 and the like. The CMs 30a and 30b have substantially similar configurations, and are connected to each other through a communication line.

As depicted in FIG. 3, the CM 30a includes multiple (two, in the example depicted in FIG. 3) CAs 300-0 and 300-1, and further includes a CPU 301, an RAM 302, an ROM 303, and an expander 304. The CM 30b includes multiple (two, in the example depicted in FIG. 3) CAs 300-2 and 300-3, and further includes a CPU 301, an RAM 302, an ROM 303, and an expander 304. In other words, the CM 30a and the CM 30b are configured similarly or substantially similarly, except that the CM 30a includes the CAs 300-0 and 300-1, while the CM 30b includes the CAs 300-2 and 300-3. The reference symbol 30a or 30b is used hereinafter when reference is made to specific one of the multiple CMs while reference symbol 30 is used when reference is made to any of the CMs. Further, the CM 30a may be sometimes referred to as the CM 0, and the CM 30b may be sometimes referred to as the CM 1. Further, the reference symbols 300-0 to 300-3 are used hereinafter when reference is made to a specific one of the multiple CA while reference symbol 300 is used when reference is made to any of the CAs. Further, the CA 300-0 may be sometimes referred to as the CA 0. Similarly, the CA 300-1 may be sometimes referred to as the CA 1, the CA 300-2 may be sometimes referred to as the CA 2, and the CA 300-3 may be sometimes referred to as the CA 3.

The reference symbols refer to the same or substantially the same portions referenced to in the drawings, and their detailed description will be omitted.

A CA 300 is an interface controller (communication adaptor) that communicably connects to the host apparatus 2 and the like. The CA 300 receives data sent from the host apparatus 2 and the like, and sends data output from the CM 30 to the host apparatus 2 and the like. In other words, the CA 300 controls inputs and outputs (I/Os) of data from and to external apparatuses, such as the host apparatus 2.

The ROM 303 is a storage device that stores programs executed by the CPU 301 and various types of data, and is a flash ROM, for example.

The expander 304 is an interface for communicatively connecting to the HDDs 60 or a drive enclosure (not illustrated) and includes a device adaptor and the like. The CM 30 reads and writes data from and to the HDDs 60 through the expander 304.

The RAM 302 is a storage area that temporarily stores various types of data and programs, and is used by the CPU 101 for temporarily storing and expanding the data and the programs when executing a program.

As depicted in FIG. 2, the RAM 302 includes a region 3401 to store storage management information 401. Thus, the RAM 302 functions as a storage management information storage section that stores storage management information 401 managing configuration information about all of the CMs 30 in the storage apparatus 10. It should be noted that the storage management information 401 is generated by a storage management information generation section 111 which will be described later.

The RAM 302 further includes a region 3402 to store CA information 402 which will be described later. Thus, the RAM 302 functions as a notification information storage section that stores CA information (notification information) 402 including target information about all of the CAs 300 in the storage apparatus 10. It should be noted that the CA information 402 is generated by a CA information generation section 12 which will be described later.

The CPU 301 is a processing apparatus that performs various types of computing and controls, and implements various functions by executing programs stored in the ROM 303. For example, the CPU 301 implements various functions as a well-known disk RAID controller, such as implementation of an RAID, access controls to the HDDs 60 in response to a host I/O from the host apparatus 2. Further, as depicted in FIG. 1, the CPU 301 functions as a storage management information generation section 111, a storage management information updating section 11, a CA information generation section 12, a CA information updating section 13, a CA information transmission section 14, and an update information transmission section 15.

The storage management information generation section 111 generates storage management information 401, and stores the generated storage management information 401 in the RAM 302. The storage management information 401 is information about all components in the storage apparatus 10, and includes configuration information about each part or function provided in the storage apparatus 10 and various setting values. For example, the storage management information 401 includes configurations and various setting information on the RAID and the HDDs 60. The storage management information 401 further includes target information about all of the CAs 300 (CA 300-0 to CA 300-3) in the storage apparatus 10. Specifically, the target information includes the iSCSI names, the IP addresses, the TCP port information, and the Target Portal Group Numbers of the CAs 300, and is information collected through a SendTargets command sent from the host apparatus 2, for example. The generated storage management information 401 is stored in a predetermined region 3401 in the RAM 302.

Further, when the target information about the CAs 300 is modified by means of some sort of technique, the CPU 301 is notified of the modification. This notification may be implemented with a wide variety of well-known techniques, such as through an interrupt signal, for example.

The CA information generation section (notification information generation section) 12 generates CA information 402 in response to the target information on the CAs 300 being modified.

Specifically, the CA information generation section 12 generates CA information 402 by extracting target information about all of the CAs 300 in the storage apparatus 10, from the storage management information 401 stored in the region 3401 in the RAM 302. The generated CA information 402 is stored in a predetermined region 3402 in the RAM 302.

The CA information transmission section (notification information transmission section) 14 sends the CA information 402 to the host apparatus 2. In response to receiving a target information obtainment request from the host apparatus 2, the CA information transmission section 14 sends the CA information 402 stored in the region 3402 in the RAM 302 to the sender (requesting) host apparatus 2. Every time the CA information transmission section 14 receives a target information obtainment request from the host apparatus 2, the CA information transmission section 14 sends CA information 402 as the response.

The storage management information updating section (updating section) 11 updates, when a some sort of a configuration modification is made in the CM 30 wherein the CPU 301 functioning as this updating section 11 is provided (hereinafter, referred to as the local CM; e.g., the CM 0), the storage management information 401 stored in the RAM 302 in the local CM 30 (CM 0) by reflecting the modified configuration.

When receiving updated storage management information 401 together with an update notification, from the update information transmission section 15 (which will be described later) in another CM 30 (e.g., the CM 1), the storage management information updating section 11 updates in the storage management information 401 stored the region 3401 in the RAM 302 in the local CM by replacing (overwriting) the storage management information 401 with the received storage management information 401.

It should be noted that the update of the storage management information 401 by the storage management information updating section 11 is not limited to update by replacing it with storage management information 401 sent from the other CM 30, as described above. Various modification may be possible, such as the storage management information updating section 11 may send and receive only part of data modified in an update to the storage management information 401, and the storage management information 401 may be partially updated using the partial data.

It is desirable to use any of well-known exclusive control technique when updating the storage management information 401 such that the storage management information 401 is not simultaneously updated by multiple CMs 30.

The update information transmission section 15 sends, when some type of configuration modification is made in the local CM (e.g., the CM 1), modification information about that modification, to all of CM(s) 30 other than the local CM 30 (e.g., the CM 1) in the storage apparatus 10 (hereinafter, referred to as other CM; e.g., the CM 1).

For example, the update information transmission section 15 sends, to the other CM 30, a copy of the storage management information 401 updated by the storage management information generation section 111, as modification information, together with a notification that the update was made (update notification). Accordingly, if a configuration modification is made in a CA 300, the update notification includes target information about the CA 300 after the modification. In other words, when target information about the CA 300 in the local CM 30 is modified, the modification information transmission section 15 sends modification information about that modification of the target information, to all other CMs 30 in the storage apparatus 10.

The CA information updating section (updating section) 13 updates the CA information 402, based on the storage management information 401 updated by the storage management information updating section 11. For example, the CA information updating section 13 generates new CA information 402 by extracting target information from the storage management information 401 updated by the storage management information updating section 11. The CA information updating section 13 then updates the CA information 402 stored in the region 3402 in the RAM 302 in the local CM by replacing (overwriting) the CA information 402 with the newly generated CA information 402.

It is noted that update of CA information 402 by the CA information updating section 13 is not limited to update by replacing the CA information 402 with the newly generated CA information 402 as described above. Various modification may be possible, such as the CA information updating section 13 may partially update CA information 402 using only a part of data modified in an update to the storage management information 401.

Processing in the storage system 1 as one example of the first embodiment configured as described above will be described with reference to FIG. 4.

Figure 4:
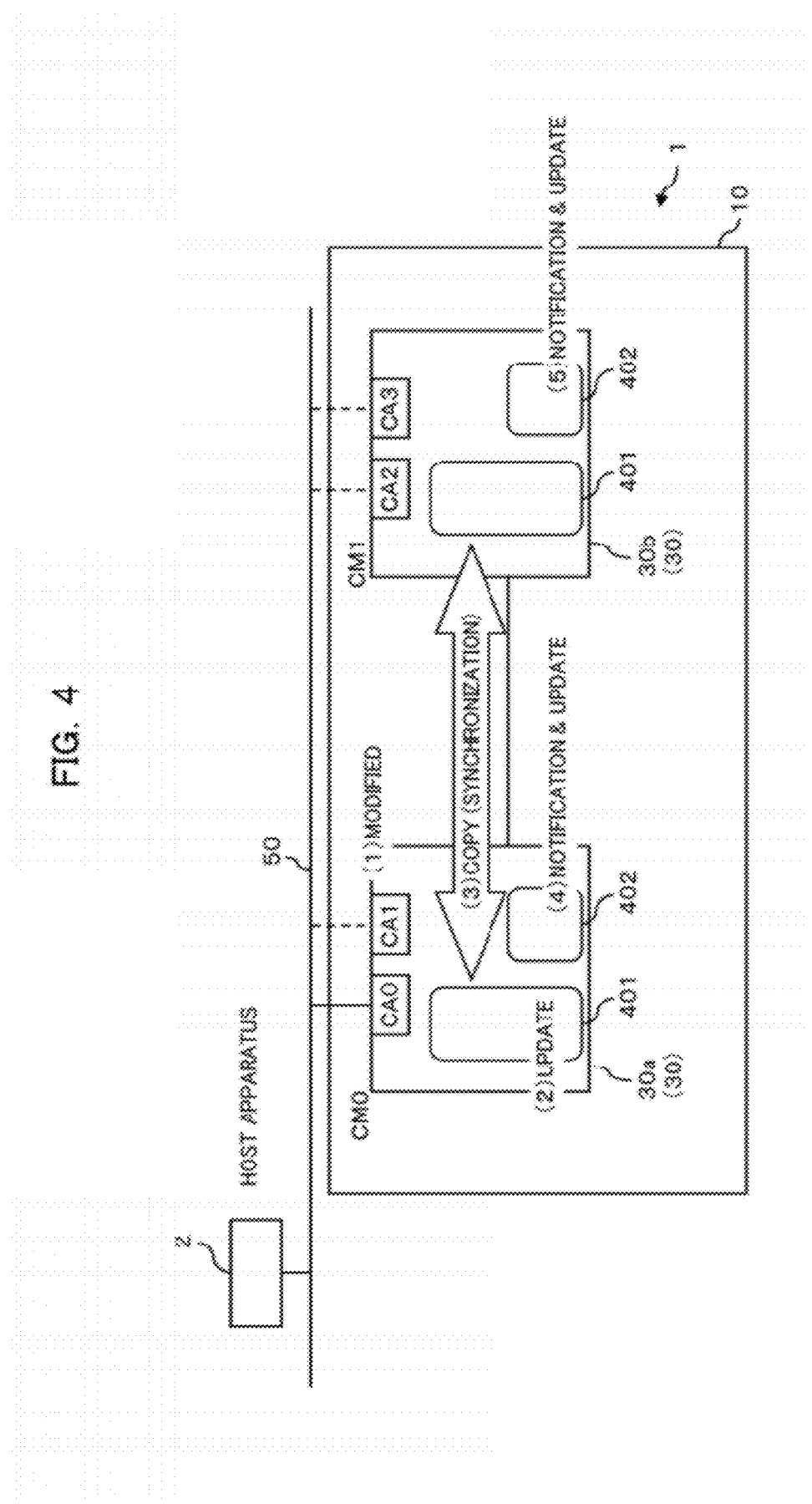
FIG. 4 is a diagram illustrating how CA information is updated in the storage system as one example of the first embodiment.

FIG. 4 is a diagram illustrating how CA information 402 is updated in the storage system 1 as one example of the first embodiment. In the example depicted in FIG. 4, the iSCSI Name of the CA 1 in the CM 0 is modified.

(1) The iSCSI Name is modified in the CA 1 in the CM 0 by changing the setting, for example.

(2) In the CM 0, the storage management information updating section 11 updates the storage management information 401, based on information on the modified iSCSI Name.

(3) The update information transmission section 15 sends a copy of the updated storage management information 401, together with an update notification, to the other CM 1. In the CM 1, in the storage management information 401 stored the region 3401 in the RAM 302 in the local CM is modified by replacing the storage management information 401 with the storage management information 401 sent from the CM 0.

(4) In the CM 0, the CA information updating section 13 generates new CA information 402 by extracting target information from the updated storage management information 401. The CA information updating section 13 then updates the CA information 402 stored in the region 3402 in the RAM 302 in the local CM by replacing the CA information 402 with the newly generated CA information 402.

(5) Also in the CM 1, the CA information updating section 13 generates new CA information 402 by extracting target information from the storage management information 401 updated in the above Step (3). The CA information updating section 13 then updates the CA information 402 stored in the region 3402 in the RAM 302 in the local CM by replacing the CA information 402 with the newly generated CA information 402.

As described above, in accordance with the storage system 1 as the first embodiment of the present disclosure, in each CM 30, the CA information 402 includes target information about all of the CAs 300 (CAs 300-0 to CA 300-3) in the storage apparatus 10. Therefore, target information about all of the CA ports in the RAID apparatus can be notified promptly in response to a request from the host apparatus 2.

Furthermore, the update information transmission section 15 sends a copy of the storage management information 401 updated in the local CM 30, together with an update notification, to the other CM 30. In the other CM 30, the CA information updating section 13 updates the CA information 402 based on the received updated storage management information 401. Therefore, a modification to target information on the CA 300 made in any of the CMs 30 can be reflected to the CA information 402 in the other CM 30. Thus, CA information 402 is synchronized among the CMs 30, which can improve the reliability.

(B) Description of Second Embodiment

A storage system 1 of a second embodiment includes a storage apparatus 10 and provides one or more host apparatuses 2 communicably connected to the storage system 1 by means of the iSCSI, with storage regions, as in the first embodiment.

Figure 5:
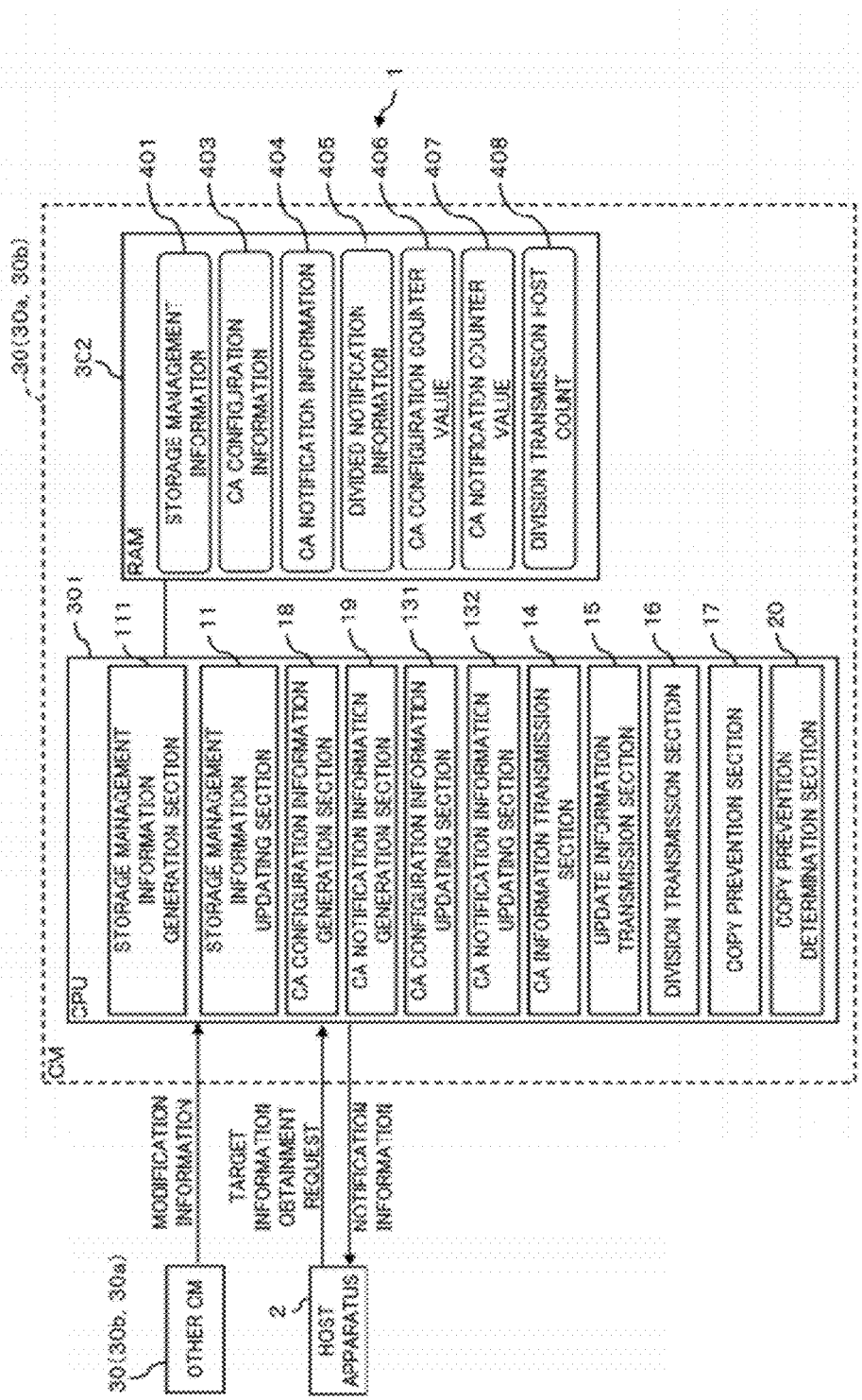
FIG. 5 is a diagram schematically illustrating a functional configuration of a CM provided in a storage system as one example of a second embodiment.
Figure 6:
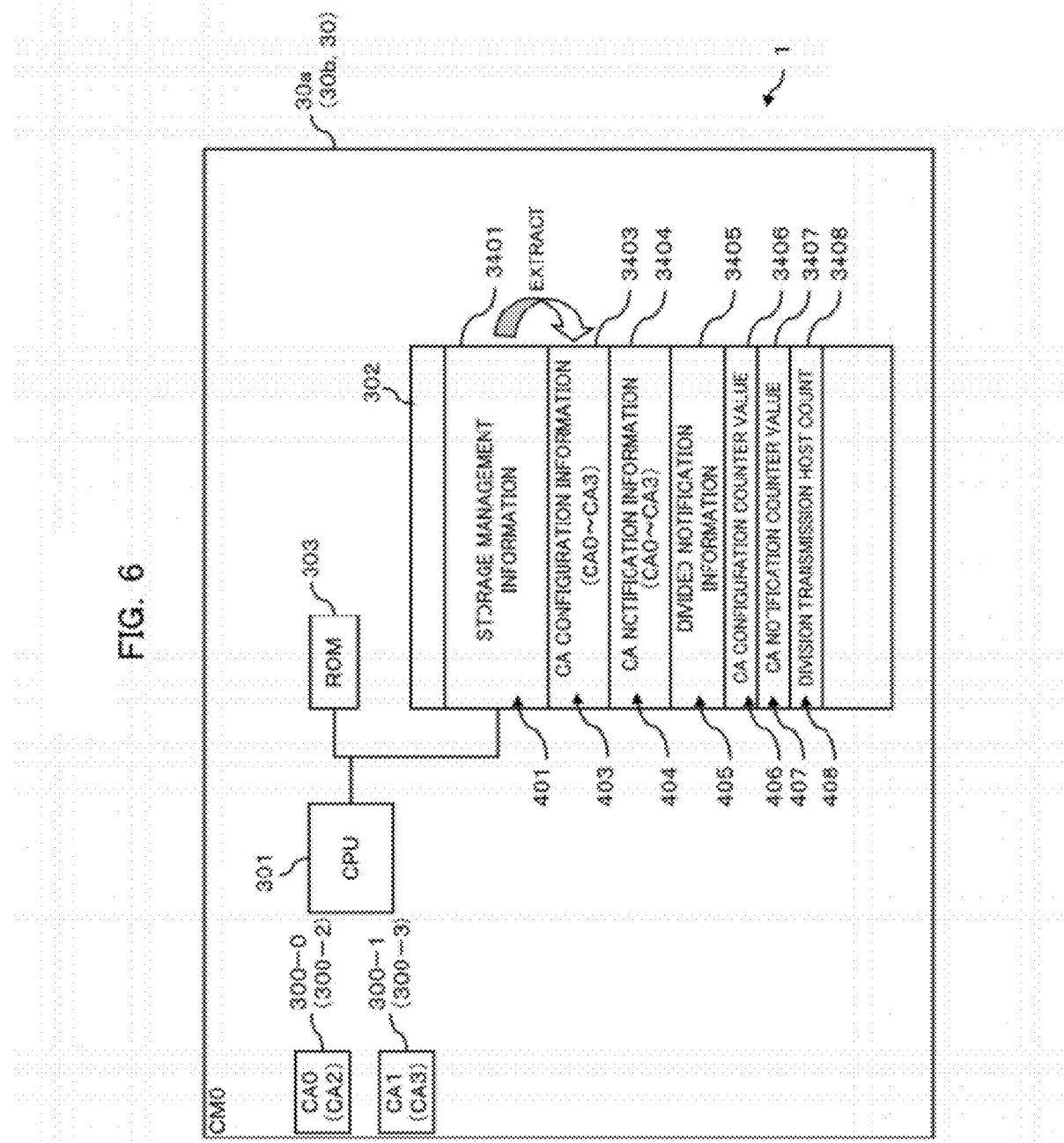
FIG. 6 is a diagram schematically illustrating a hardware configuration of a CM provided in the storage system as one example of the second embodiment.

FIG. 5 is a diagram schematically illustrating an example of a functional configuration of a CM provided in a storage system 1 as one example of a second embodiment, and FIG. 6 is a diagram schematically illustrating an example of a hardware configuration thereof.

As depicted in FIG. 5, the storage system of the second embodiment includes a function as a CA configuration information updating section 131, in place of the CA information updating section 13 in the storage system 1 of the first embodiment. Further, the storage system of the second embodiment includes functions as a CA configuration information generation section 18, a CA notification information generation section 19, a division transmission section 16, a copy prevention section 17, a CA notification information updating section 132, and a copy prevention determination section 20, in addition to the functions of the storage system 1 of the first embodiment. Other components are similarly configured as those in the storage system 1 of the first embodiment.

In other words, the CPU 301 functions as a storage management information generation section 111, a storage management information updating section 11, a CA configuration information generation section 18, a CA notification information generation section 19, a CA configuration information updating section 131, a CA notification information updating section 132, a CA information transmission section 14, an update information transmission section 15, a division transmission section 16, a copy prevention section 17, and a copy prevention determination section 20.

Further, as depicted in FIG. 5, in the storage system 1 of the present second embodiment, the RAM 302 includes storage management information 401, CA configuration information 403, CA notification information 404, divided notification information 405, a CA configuration counter value 406, a CA notification counter value 407, and division transmission host count information 408.

Note that descriptions of the elements having the same reference symbols in the drawings as the elements described previously will be emitted since they refer to the same or substantially the same elements set forth previously.

Similarly to the notification information generation section 18 in the first embodiment, the CA configuration information generation section (first notification information generation section) 18 generates CA configuration information (first notification information) 403 by extracting target information about all of the CAs 300 in the storage apparatus 10 from the storage management information 401 stored in the region 3401 in the RAM 302. The generated CA configuration information 403 is stored in a predetermined region 3403 in the RAM 302, as depicted in FIG. 6. In other words, the RAM 302 functions as a first notification information storage section that stores the CA configuration information 403.

The CA configuration information updating section (first notification information updating section) 131 carries out processing similar to the processing of the CA information updating section 13 of the first embodiment, and updates the CA configuration information 403, based on the storage management information 401 updated by the storage management information updating section 11. That is, for example, the CA configuration updating section 131 generates new CA configuration information 402 by extracting target information from the storage management information 401 updated by the storage management information updating section 11. The CA configuration information updating section 131 then updates the CA configuration information 403 stored in the region 3403 in the RAM 302 in the local CM by replacing (overwriting) with the newly generated CA configuration information 403.

It is noted that update of CA configuration information 403 by the CA configuration information updating section 131 is not limited to update by replacing the CA configuration information 403 with the newly generated CA configuration information 403 as described above. Various modification may be possible, such as the CA configuration information updating section 131 may partially update CA configuration information 403 using only a part of data modified in an update to the storage management information 401.

The CA notification information generation section (second notification information generation section) 19 generates CA notification information 404 by copying the CA configuration information 403 stored in the region 3402 in the RAM 302. The generated CA notification information 404 is stored in a predetermined region 3404 in the RAM 302, as depicted in FIG. 6. In other words, the RAM 302 functions as a second notification information storage section that stores the CA notification information 404. Further, in the present second embodiment, the CA information transmission section 14 sends the CA notification information 404 to the host apparatus 2, with a technique similar to that used in the first embodiment.

The CA notification information updating section (second notification information updating section) 132 generates new CA notification information 404 by copying the CA configuration information 403, in response to receiving a target information obtainment request from the host apparatus 2. The CA notification information updating section 132 then updates the CA notification information 404 stored in the region 3404 in the RAM 302 in the local CM by replacing (overwriting) the CA notification information 404 with the newly generated CA notification information 404.

The division transmission section 16 divides the CA notification information 404 into multiple pieces of divided notification information 405, and sends the multiple pieces of divided notification information 405 to the host apparatus 2 one by one (division transmission).

In the present second embodiment, the CPU 301 (division determination unit) compares the data size of the CA notification information 404 with a predetermined reference value. If the data size of the CA notification information 404 is greater than the reference value, the CA information transmission section 14 does not send the CA notification information 404. Instead, pieces of divided notification information 405 are generated by the division transmission section 16 and the pieces of divided notification information 405 are sent to the host apparatus 2.

It should be noted that various techniques may be used for dividing the CA notification information 404 into multiple pieces of divided notification information 405. For example, the CA notification information 404 may be divided into pieces of a certain size, or the CA notification information 404 may be divided in accordance with target information included in the CA notification information 404.

The generated divided notification information 405 is stored in a predetermined region 3405 in the RAM 302, as depicted in FIG. 6. In other words, the RAM 302 functions as a divided notification information storage section that stores the divided notification information 405.

The division transmission section 16 divides the CA notification information 404 into multiple pieces of divided notification information 405 and stores them in a predetermined region 3405 in the RAM 302, in response to receiving an information obtainment request from the host apparatus 2. The division transmission section 16 then sends the multiple pieces of divided notification information 405 stored in the region 3405, to the host apparatus 2 one by one (division transmission).

The copy prevention determination section 20 determines whether to block copy of the CA configuration information 403 to the CA notification information 404 by the copy prevention section 17 which will be described later. The copy prevention determination section 20 determines whether the status of the storage apparatus 10 matches any of predetermined copy prevention conditions.

Specifically, the first copy prevention condition (first copy prevention condition) is that the count of updates to the CA configuration information 403 by the CA configuration information updating section 131 matches the count of updates to the CA notification information 404 by the CA notification information updating section 132. The second copy prevention condition (second copy prevention condition) is that the division transmission section 16 is sending the divided notification information 405 to the host apparatus 2 (is carrying out a division transmission).

First, the first copy prevention condition will be described. The CA configuration information updating section 131 increments the CA configuration counter value 406 every time the CA configuration information 403 is updated. The CA configuration counter value 406 is stored in a predetermined region 3406 in the RAM 302, for example. Further, the CA notification information updating section 132 increments the CA notification counter value 404 every time the CA notification information 407 is updated. The CA configuration counter value 407 is similarly stored in a predetermined region 3407 in the RAM 302 for example.

The copy prevention determination section 20 compares the CA configuration counter value 406 with the CA notification counter value 407, and if the CA configuration counter value 406 matches the CA notification counter value 407, the copy prevention determination section 20 notifies the copy prevention section 17 of the match.

Next, the second copy prevention condition will be described. The division transmission section 16 increments (counts up) the division transmission host count 408 when multiple pieces of divided notification information 405 are sent to the CA notification information 404. The division transmission host count 408 is stored in a predetermined region 3408 in the RAM 304 for example. In contrast, the division transmission host count 408 decrements (counts down) the division transmission host count 408 if a division transmission is no more required while processing a request from the host apparatus 2 involved in a division transmission.

If the value of the division transmission host count 408 is not zero, the copy prevention determination section 20 notifies the copy prevention section 17 that the division transmission host count 408 is not zero.

If at least one of the first and second copy prevention conditions is met, the copy prevention determination section 20 notifies the copy prevention section 17 that at least one of the conditions is met.

The copy prevention section 17 controls copy of the CA configuration information 403 by the CA notification information updating section 132 to the CA notification information 404, and blocks any unnecessary copy. More specifically, if the copy prevention determination section 20 determines that at least one of the first and second copy prevention conditions described above is met, the copy prevention section 17 blocks copy of the CA configuration information 403 by the CA notification information updating section 132 to the CA notification information 404.

If the copy prevention determination section 20 determines that none of the first and second copy prevention conditions described above is met, the copy prevention section 17 allows copy of the CA configuration information 403 by the CA notification information updating section 132 to the CA notification information 404.

For example, the copy prevention section 17 has a function to set a flag for a predetermined storage region in the RAM 302 and the like, and sets a value (for example, "1") indicating that copy is to be blocked to that flag, if it is determined that copy is not necessary. If the value indicating that copy is to be blocked is set to that flag, the CA notification information generation section 19 does not copy the CA configuration information 403 stored in the region 3402 in the RAM 302 to the CA notification information 404.

Here, processing by the copy prevention determination section 20 in the storage system 1 of the second embodiment configured as described above will be described with reference to FIG. 7.

Figure 7:
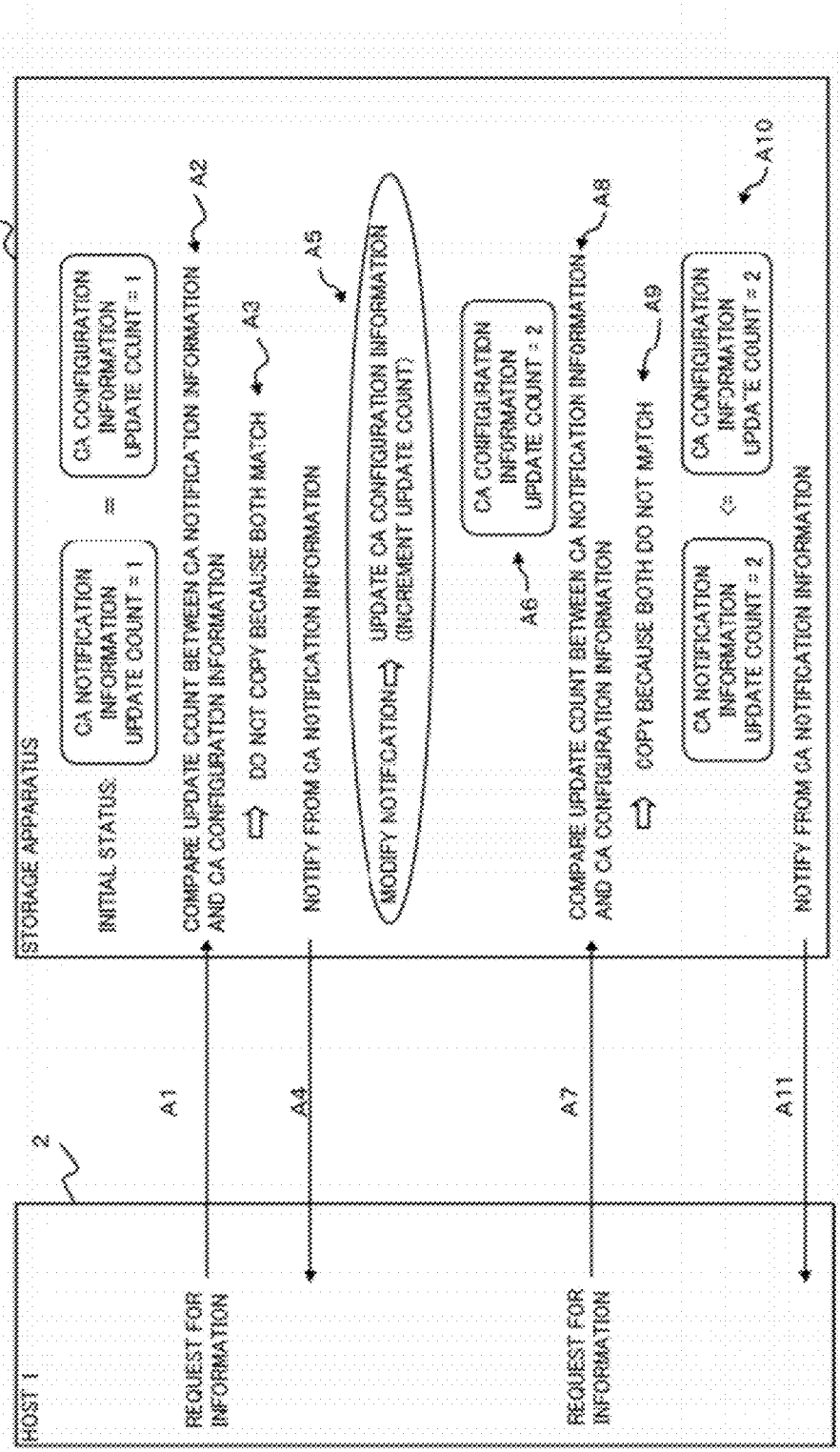
FIG. 7 is a sequence diagram illustrating processing by a copy prevention determination section in the storage system as one example of the second embodiment.

FIG. 7 is a sequence diagram illustrating processing by the copy prevention determination section 20 in the storage system 1 of the second embodiment, indicating processing based on the first copy prevention condition described above. It should be noted that in the example depicted in FIG. 7, the CA notification information update count (CA notification counter value) and the CA configuration information update count (CA configuration counter value) are initially both 1.

When an obtainment request for target information is made to the storage apparatus 10 from the host apparatus 2 (see the reference symbol A1), in the storage apparatus 10, the copy prevention determination section 20 compares the count of updates to the CA configuration information 403 by the CA configuration information updating section 131 with the count of updates to the CA notification information 404 by the CA notification information updating section 132 (see the reference symbol A2). At this point in time, since the update count of the CA configuration information matches the update information of CA notification information, the copy prevention determination section 20 notifies the copy prevention section 17 that the copy prevention condition is met. As a result, the copy prevention section 17 blocks copy of the CA configuration information 403 by the CA notification information updating section 132 to the CA notification information 404 (see the reference symbol A3).

The CA information transmission section 14 then sends the CA notification information 404 stored in the RAM 302 as a response to the host apparatus 2 (see the reference symbol A4).

When target information is modified in any of the CAs 300 in the storage apparatus 10, the modification notification is sent to the CMs 30 and the storage management information updating section 11 updates the storage management information 401 stored in the RAM 302. In response, the CA configuration information updating section 131 updates the CA configuration information 403 (see the reference symbol A5). As a result, the CA configuration counter value 406 is incremented and the CA configuration information update count counts up to 2 (see the reference symbol A6).

Thereafter, when an obtainment request for target information is made to the storage apparatus 10 from the host apparatus 2 (see the reference symbol A7), in the storage apparatus 10, the copy prevention determination section 20 compares the count of updates to the CA configuration information 403 by the CA configuration information updating section 131 with the count of updates to the CA notification information 404 by the CA notification information updating section 132 (see the reference symbol A8).

At this point in time, since the update count of the CA configuration information does not match the update information of CA notification information, the copy prevention determination section 20 determines that none of the copy prevention conditions is met and the copy prevention section 17 does not block copy of the CA configuration information 403 to the CA notification information 404. As a result, the CA configuration information 403 is copied to the CA notification information 404 by the CA notification information updating section 132 (see the reference symbol A9). More specifically, the CA notification information 404 is updated, and the CA notification counter value 407 is incremented and the CA notification information update count counts up to 2 (see the reference symbol A10).

The CA information transmission section 14 then sends the CA notification information 404 stored in the RAM 302 as a response to the host apparatus 2 (see the reference symbol A11).

Thereafter, the storage apparatus 10 responses to information obtainment requests from the host apparatus 2 in the similar manner.

Next, processing by the copy prevention determination section 20 in the storage system 1 of the second embodiment during a division transmission will be described with reference to FIG. 8.

Figure 8:
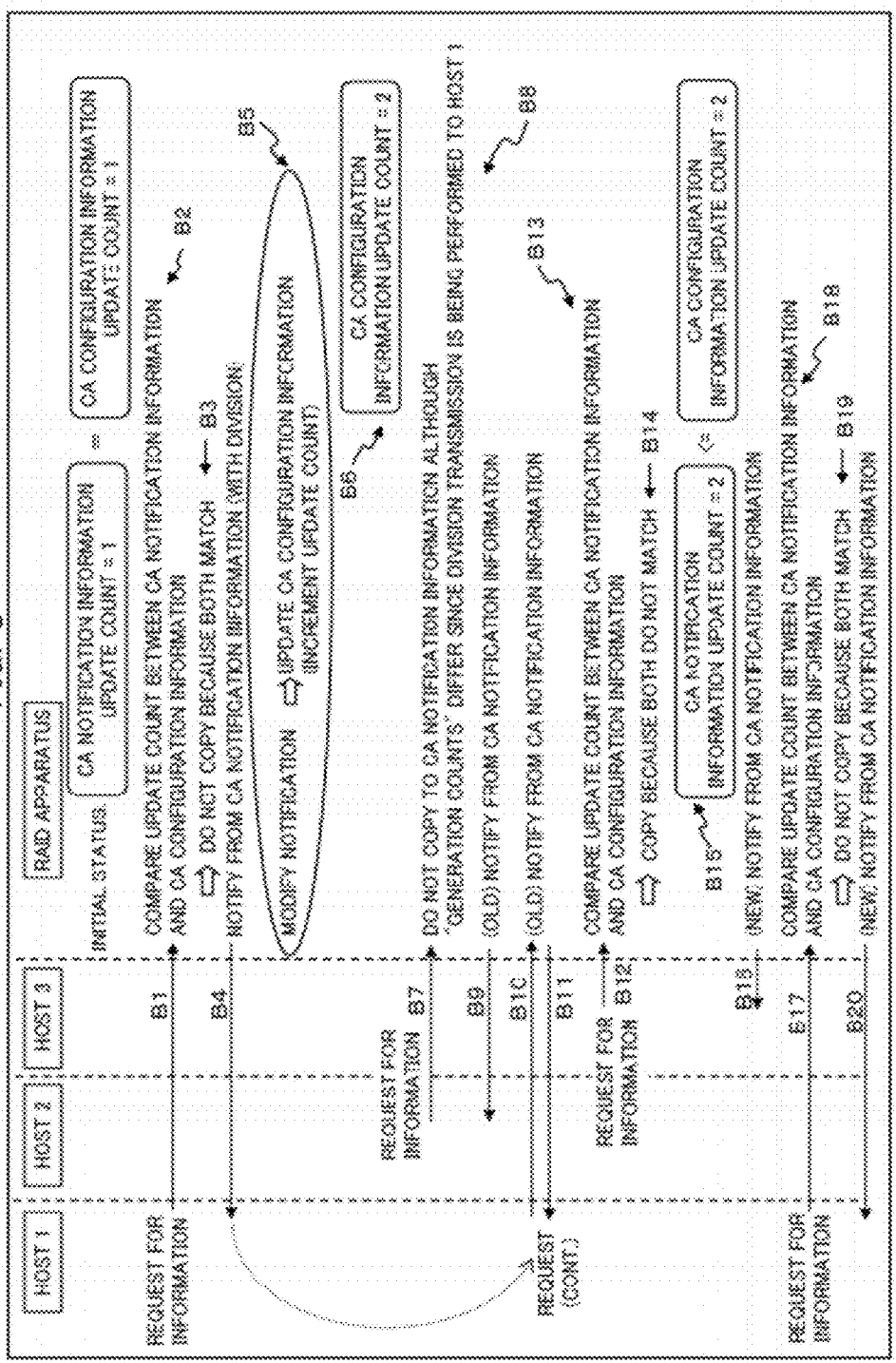
FIG. 8 is a sequence diagram illustrating processing by the copy prevention determination section in the storage system as one example of the second embodiment during a division transmission.

FIG. 8 is a sequence diagram illustrating processing by the copy prevention determination section 20 in the storage system 1 of the second embodiment during a division transmission, indicating processing based on the second copy prevention condition described above. It should be noted that also in the example depicted in FIG. 8, the CA notification information update count (CA notification counter value) and the CA configuration information update count (CA configuration counter value) are initially both 1. Further, in the example in FIG. 8, obtainment requests for target information are made from three host apparatuses 2 denoted as hosts 1 to 3.

When an obtainment request for target information is made to the storage apparatus 10 from the host 1 (see the reference symbol B1), in the storage apparatus 10, the copy prevention determination section 20 compares the count of updates to the CA configuration information 403 by the CA configuration information updating section 131 with the count of updates to the CA notification information 404 by the CA notification information updating section 132 (see the reference symbol B2). At this point in time, since the update count of the CA configuration information matches the update information of CA notification information, the copy prevention determination section 20 notifies the copy prevention section 17 that the copy prevention condition is met. As a result, the copy prevention section 17 blocks copy of the CA configuration information 403 by the CA notification information updating section 132 to the CA notification information 404 (see the reference symbol B3).

The CA information transmission section 14 then notifies the host 1 of the CA notification information 404 stored in the RAM 302 as a response (see the reference symbol B4). However, the division transmission section 16 sends the CA notification information 404 in the form of divided notification information 405 since the data size of the CA notification information 404 is greater than a reference value.

In the example in FIG. 8, the CA notification information 404 is divided into two pieces of divided notification information 405, which are then sent. Further, each piece of the divided notification information 405 is appended with a continue bit indicating that the data is divided and a subsequent piece of data is present, and an identifier for identifying the subsequent piece of data, for example.

When target information is modified in any of the CAs 300 in the storage apparatus 10, the modification notification is sent to the CMs 30 and the storage management information updating section 11 updates the storage management information 401 stored in the RAM 302. In response, the CA configuration information updating section 131 updates the CA configuration information 403 (see the reference symbol B5). As a result, the CA configuration counter value 406 is incremented and the CA configuration information update count counts up to 2 (see the reference symbol B6).

Thereafter, when an obtainment request for target information is made to the storage apparatus 10 from the host 2 at this time (see the reference symbol B7), in the storage apparatus 10, the copy prevention determination section 20 compares the count of updates to the CA configuration information 403 by the CA configuration information updating section 131 with the count of updates to the CA notification information 404 by the CA notification information updating section 132. At this point in time, although the update count of the CA configuration information does not match the update information of CA notification information, the copy prevention determination section 20 determines that the copy prevention conditions is met since the division transmission to the host 1 is being performed. The copy prevention determination section 20 then notifies the copy prevention section 17 that the copy prevention conditions is met. As a result, the copy prevention section 17 blocks copy of the CA configuration information 403 by the CA notification information updating section 132 to the CA notification information 404 (see the reference symbol B8).

The CA information transmission section 14 then notifies the host 2 of the CA notification information 404 stored in the RAM 302 as a response (see the reference symbol B9). It should be noted that the CA notification information 404 notified to the host 2 does not reflect the update to the CA configuration information 403 made in the step indicated by the reference symbol B5.

Thereafter, a piece of divided notification information 405 subsequent to the piece of divided notification information 405 notified in the step indicated by the reference symbol B4 is requested to the storage apparatus 10 by the host 1 (see the reference symbol B10). In response to the request for the divided notification information 405, the subsequent piece of divided notification information 405 is sent from the storage apparatus 10 (see the reference symbol B11).

Here, when an obtainment request for target information is made to the storage apparatus 10 from the host 3 (see the reference symbol B12), in the storage apparatus 10, the copy prevention determination section 20 compares the count of updates to the CA configuration information 403 by the CA configuration information updating section 131 with the count of updates to the CA notification information 404 by the CA notification information updating section 132 (see the reference symbol B13).

At this point in time, since the update count of the CA configuration information does not match the update information of CA notification information, the copy prevention determination section 20 determines that none of the copy prevention conditions is met. In other words, copy of the CA configuration information 403 to the CA notification information 404 is not blocked by the copy prevention section 17, and accordingly, the CA configuration information 403 is copied to the CA notification information 404 by the copy prevention section 17 (see the reference symbol B14). More specifically, the CA notification information 404 is updated, and the CA notification counter value 407 is incremented and the CA notification information update count counts up to 2 (see the reference symbol B15).

The CA information transmission section 14 then notifies the host 3 of the CA notification information 404 stored in the RAM 302 as a response (see the reference symbol B16). It should be noted that the CA notification information 404 notified to the host 3 reflects the update to the CA configuration information 403 made in the step indicated by the reference symbol B5.

Thereafter, when an obtainment request for target information is made to the storage apparatus 10 from the host 1 (see the reference symbol B17), in the storage apparatus 10, the copy prevention determination section 20 compares the count of updates to the CA configuration information 403 by the CA configuration information updating section 131 with the count of updates to the CA notification information 404 by the CA notification information updating section 132 (see the reference symbol B18). At this point in time, since the update count of the CA configuration information matches the update information of CA notification information, the copy prevention determination section 20 notifies the copy prevention section 17 that the copy prevention condition is met. As a result, the copy prevention section 17 blocks copy of the CA configuration information 403 by the CA notification information updating section 132 to the CA notification information 404 (see the reference symbol B19).

The CA information transmission section 14 then notifies the host 1 of the CA notification information 404 stored in the RAM 302 as a response (see reference symbol B20).

Thereafter, the storage apparatus 10 responses to information obtainment requests from each host apparatus 2 in the similar manner.

Figure 9:
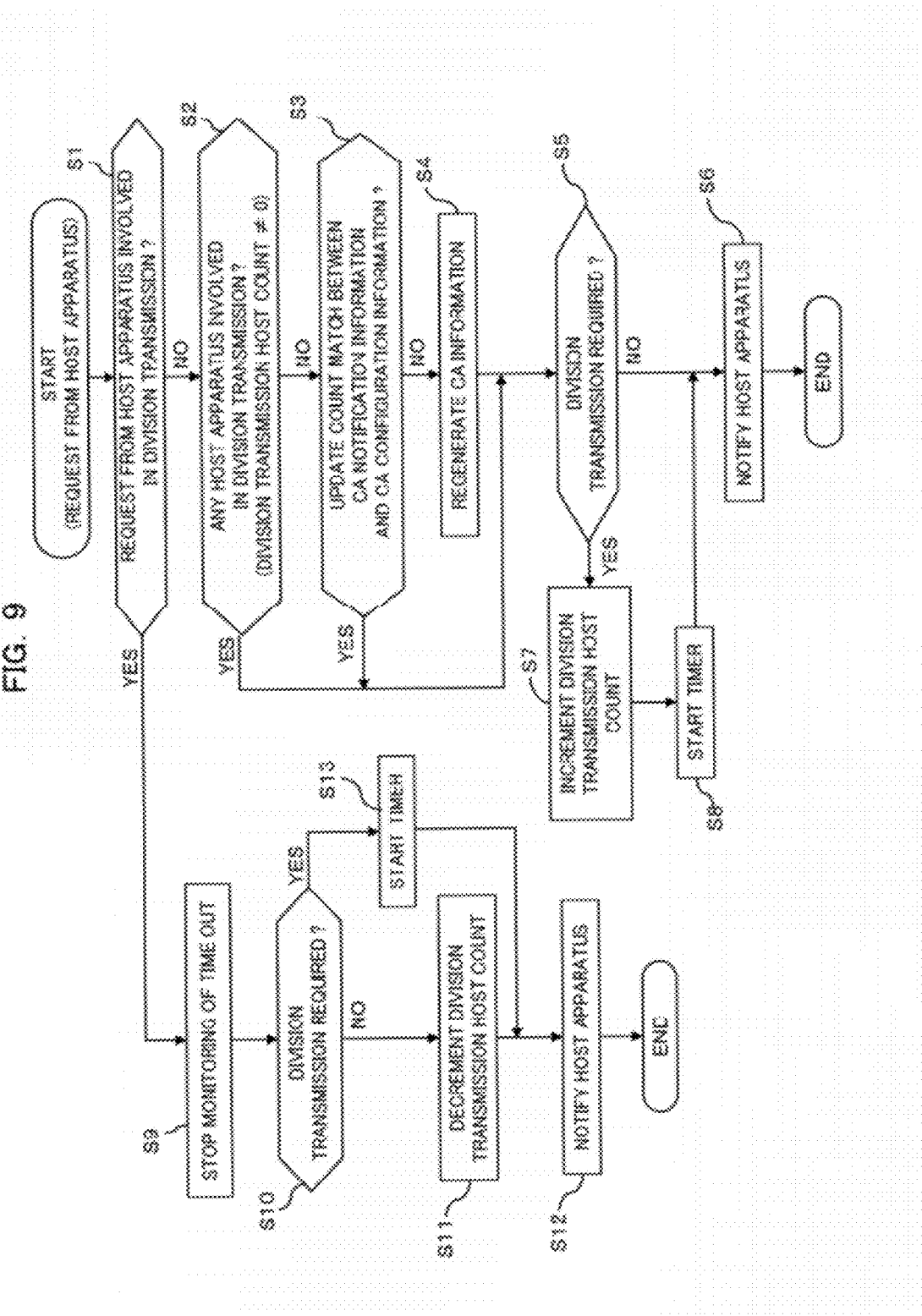
FIG. 9 is a flowchart illustrating processing by the CM in the storage system as one example of the second embodiment storage apparatus.

Next, processing by a CM 30 in the storage apparatus 10 in this storage system 1 will be described with reference to the flowcharts depicted in FIGS. 9 and 10 (Steps S1 to S13 in FIG. 9 and Step S14 in FIG. 10).

When an obtainment request for target information is made from a host apparatus 2, by means of the SendTargets command, for example, firstly, it is determined that the obtainment request for target information is a request from the host apparatus 2 involved in a division transmission (Step S1). Since an obtainment request from the host apparatus 2 involved in a division transmission is appended with an identifier for identifying subsequent piece of data in the division transmission, the determination is made based on presence or absence of such an identifier, for example.

If the request is not from the host apparatus 2 involved in a division transmission (the NO route from Step S1), the copy prevention determination section 20 determines whether any other host apparatus(es) 2 is involved in a division transmission (Step S2). Specifically, for example, the copy prevention determination section 20 determines whether the value of the division transmission host count is not zero (division transmission host count≠0) (Step S2).

If no host apparatus 2 is involved in a division transmission (refer to the NO route from Step S2), the copyprevention determination section 20 determines whether the update count of the CA configuration information matches the update information of CA notification information (Step S3).

If the update count of the CA configuration information does not match the update information of CA notification information (refer to the NO route from Step S3), the copy-prevention determination section 20 determines that none of the copy prevention conditions is met and the copy prevention section 17 does not block copy of the CA configuration information 403 to the CA notification information 404. As a result, the CA configuration information 403 is copied to the CA notification information 404 by the CA notification information updating section 132, and accordingly, CA notification information 404 is regenerated (Step S4).

Thereafter, the division transmission section 16 determines that the CA notification information 404 is required to be sent in a division transmission (Step S5). If no division transmission is required (refer to the NO route from Step S5), the CA information transmission section 14 sends the CA notification information 404 to the host apparatus 2 without dividing it (Step S6) and the processing is terminated.

Otherwise, if any other host apparatus(es) 2 is involved in a division transmission (the YES route from Step S2), or if the update count of the CA configuration information matches the update information of CA notification information (refer to the YES route from Step S3), the flow transitions to Step S5.

Then, if a division transmission is required (the YES route in Step S5), the division transmission section 16 increments the division transmission host count 408 (Step S7) and then starts a timer (not illustrated) to initiate timeout monitoring processing (Step S8).

Figure 10:
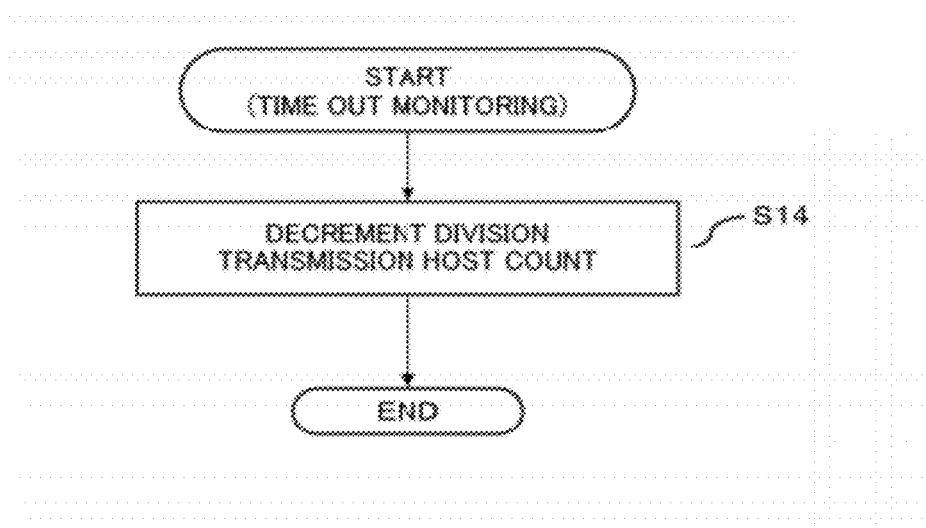
FIG. 10 is a flowchart illustrating timeout monitoring processing by the CM in the storage system as one example of the second embodiment storage apparatus.

As depicted in FIG. 10, if the timeout monitor time elapses before receiving any request from a host involved in a division transmission, the timeout monitoring processing is started. In the timeout monitoring process, the divided notification information 405 of the CA notification information 404 is deleted from the RAM 302 and the divisional host count is decremented (Step S14 in FIG. 10). Thereafter, the timeout monitoring processing is terminated and the flow transitions to Step S6.

Otherwise, if the request is from the host apparatus 2 involved in a division transmission (the YES route from Step S1), the timeout monitoring is terminated (Step S9). Thereafter, the division transmission section 16 determines whether a division transmission is required (Step S10). If the division transmission section 16 determines that a division transmission is not required (the NO route from Step S10), the division transmission section 16 decrements the division transmission host count (Step S11) and sends the divided notification information 405 to the host apparatus (Step S12). Note that when the division transmission section 16 sends a piece of divided notification information 405 without a continue bit (that is, that piece is the last one of the pieces of divided notification information 405 generated from the same CA notification information 404), the division transmission section 16 deletes the divided notification information 405 for the CA notification information 404 from the RAM 302. Thereafter, the processing is terminated.

Otherwise, if the division transmission section 16 determines that a division transmission is required (the YES route from Step S10), the timer is started and the timeout monitoring processing (refer to Step S14 in FIG. 10) is initiated (Step S13). After the timeout monitoring processing is terminated, the flow transitions to Step S12.

As described above, in accordance to the storage system 1 as one example of the second embodiment, the same advantageous effects as those of the above-described first embodiment can be obtained.

Further, the storage system 1 as one example of the present second embodiment includes the CA configuration information 403 that is updated every time a modification notification is made for a CA 300, and the CA notification information 404 that is updated by copying the CA configuration information 403 every time an information obtainment request is made from a host apparatus 2. The CA notification information 404 is sent to the host apparatuses 2.

If the update count of the CA configuration information 403 matches the update count of the CA notification information 404, copy of the CA configuration information 403 to the CA notification information 404 is blocked. The update count of the CA configuration information 403 matching the update count of the CA notification information 404 means that the CA configuration information 403 is identical to the CA notification information 404. In such a situation, unnecessary copy of the CA configuration information 403 to the CA notification information 404 is blocked, which reduces the loads of the CMs 30 to update (generate) the CA notification information 404, thereby improving the efficiency of operations by the CMs 30.

Further, copy of the CA configuration information 403 to the CA notification information 404 is also blocked during a division transmission. Thereby, even if the configuration of any CA 300 in the storage apparatus 10 is modified during the division transmission, no inconsistency arises from the configuration modification between pieces of divided notification information 405 sent before the modification and pieces of divided notification information 405 sent after the modification. Thus, the host apparatus 2 does not encounter any error.

In short, in accordance to the storage system 1 as one example of the present second embodiment, if the copy prevention determination section 20 determines that any of the copy prevention conditions (first and second copy prevention conditions) is met, the copy prevention section 17 blocks the CA notification information 404 being updated by the CA notification information updating section 132. This can improve the efficiency of update of the CA notification information 404, as well as improving the reliability during division transmissions.

(C) Description of Third Embodiment

In the present storage system 1, since target information on all of the CAs 300 in the storage apparatus 1 is stored in each CM 30 in the storage apparatus 10, the processing load in generating CA information 402 from the storage management information 401 is high. Accordingly, it is desired that CA information 402 is generated only limited times required, or that generation of CA information 402 is made infrequent.

A third embodiment provides a technique to reduce the processing load in generating CA information 402 at a startup of the storage apparatus 10.

A storage system 1 of the present third embodiment includes a storage apparatus 10 and provides one or more host apparatuses 2 communicably connected to the storage system 1 by means of the iSCSI, with storage regions, as in the first embodiment.

Figure 11:
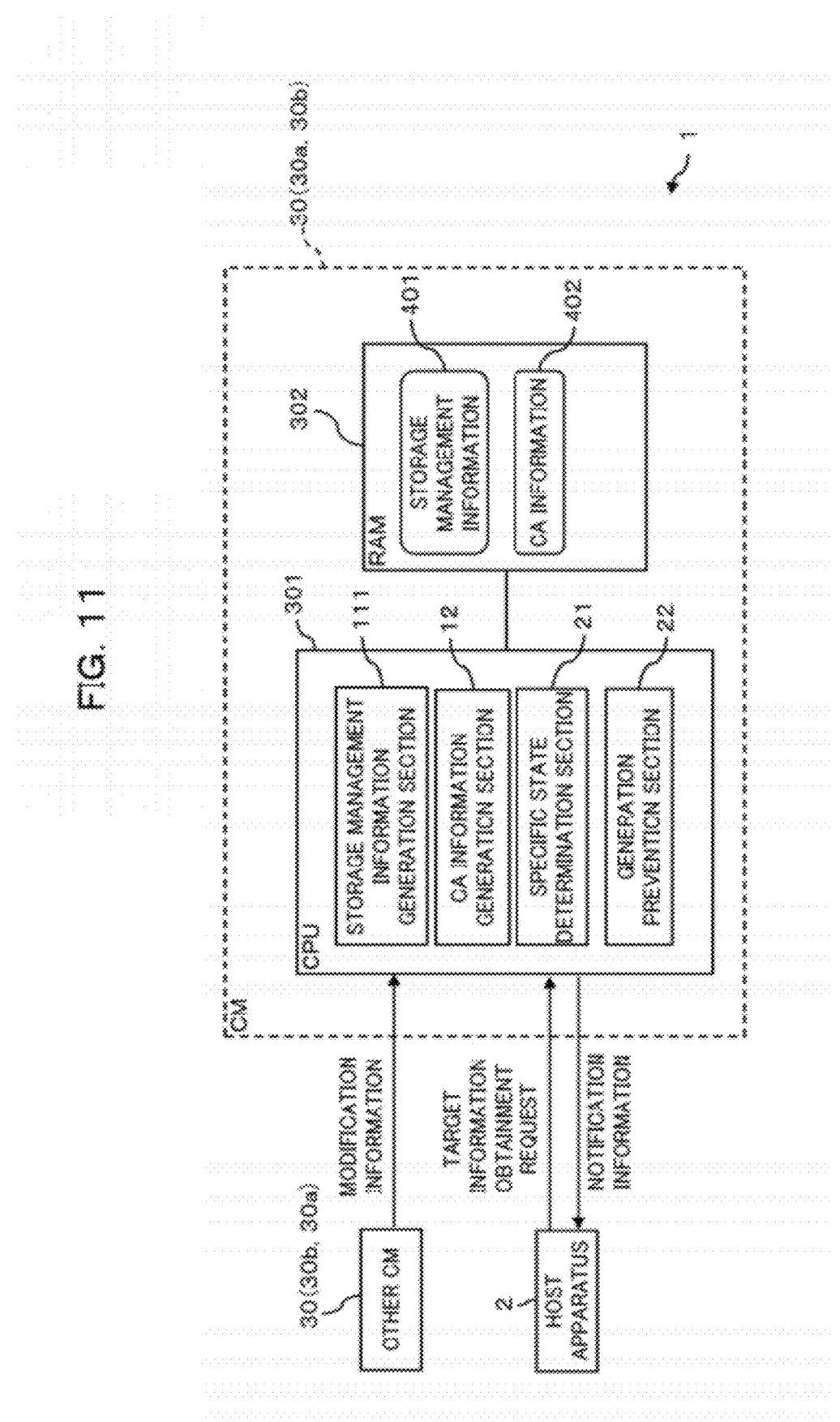
FIG. 11 is a diagram schematically illustrating a functional configuration of a CM provided in a storage system as one example of a third embodiment.

FIG. 11 is a diagram schematically illustrating a functional configuration of a CM provided in the storage system 1 as one example of the third embodiment.

As depicted in FIG. 11, the storage system 1 of the present third embodiment includes a storage management information generation section 111, a CA information generation section 12, a specific state determination section 21, and a generation prevention section 22.

The storage system 1 of the present third embodiment has the hardware configuration similar to that in the storage system 1 of the first embodiment depicted in FIGS. 2 and 3. That is, the CPU 301 implements functions as the storage management information generation section 111, the CA information generation section 12, the specific state determination section 21, and the generation prevention section 22. Note that descriptions of the elements having the same reference symbols in the drawings as the elements described previously will be emitted since they refer to the same or substantially the same elements set forth previously.

The CA information generation section (notification information generation section) 12 generates CA information 402 to be sent to a host apparatus 2. The CA information generation section 12 generates CA information 402 by extracting target information about all of the CAs 300 in the storage apparatus 10, from storage management information 401 stored in a region 3401 in the RAM 302, during the startup processing of the storage apparatus 10. The generated CA information 402 is stored in a predetermined region 3402 in the RAM 302 (refer to FIG. 2).

The generated CA information 402 is sent to a host apparatus 2, in response to a target information obtainment request from that host apparatus 2.

The specific state determination section 21 determines whether or not the storage apparatus 10 is in any of specific states during the startup processing of the storage apparatus 10. The specific states define conditions for blocking generation of CA information 402 by the CA information generation section 12, and include the following three statuses, for example.

Specific state 1: A target information obtainment request received from a host apparatus is the second or subsequent target information obtainment request from a host apparatus 2.

Typically, during the processing step at the power on (PON) or an inclusion of a CA in the storage apparatus 10 (hereinafter, these are collectively referred to as "during the startup processing"), a target information obtainment request is sent from each host apparatus 2 connected to a CM 30. In the present third embodiment, during the startup processing, CA information 402 is generated for the first target information obtainment request sent from a host apparatus 2, but no CA information 402 is generated for the second and subsequent target information obtainment requests during the startup processing. In other words, the CA information 402 generated for the first target information obtainment request is reused for the second and subsequent target information obtainment requests during the startup processing.

For example, assuming that 40 host apparatuses 2 are connected to the storage apparatus 10, CA information 402 is generated for a target information obtainment request from the first host apparatus 2. For the remaining 39 host apparatuses 2, no CA formation 402 is generated and the CA information 402 generated for the first host apparatus 2 is reused.

It should be noted that the determination as of whether a target information obtainment request is the first or the second or subsequent target information obtainment request can be made by storing, in the CM 30, the history of commands or logins received from the host apparatuses 2, and checking that connection history.

Figure 12:
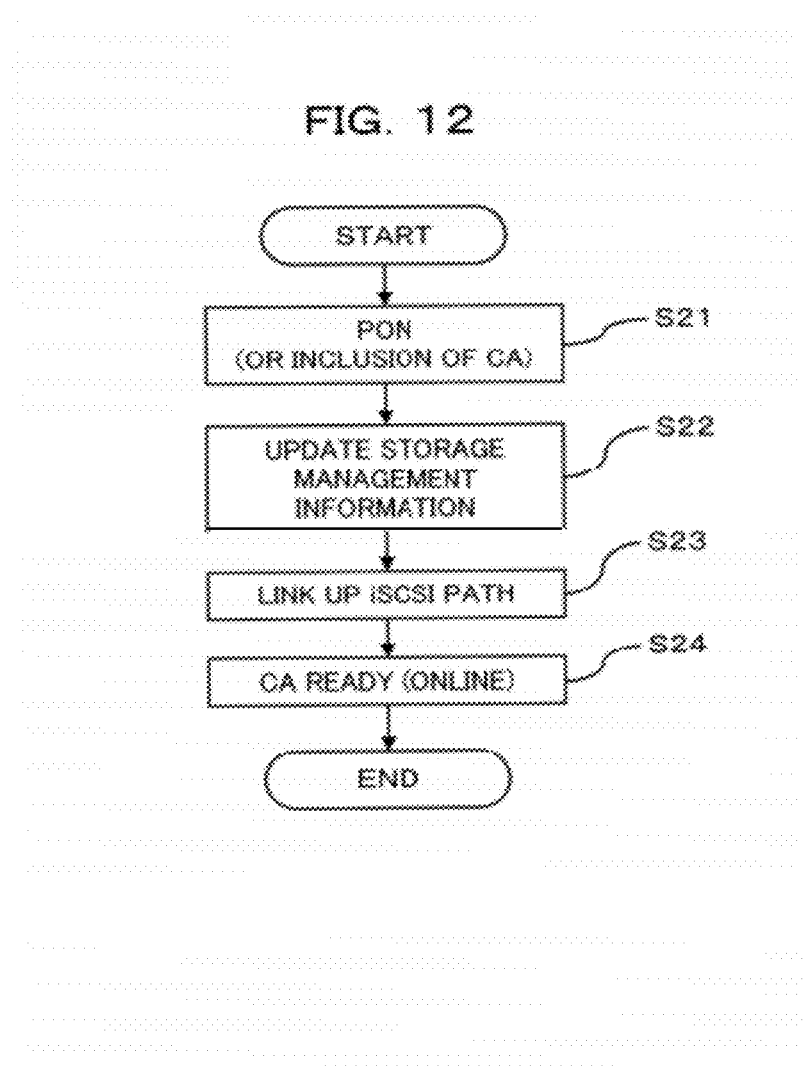
FIG. 12 is a flowchart illustrating processing upon a startup of a typical RAID apparatus.

FIG. 12 is a flowchart (Steps S21 to S24) illustrating processing upon a startup of a typical RAID apparatus.

When a PON or incorporation of a CA occurs in the RAID apparatus (Step S21), storage management information 401 of the CM is updated (Step S22). Thereafter, after linkup of an iSCSI path is made (Step S23), the CA becomes the ready state (online) in which commands from the host apparatuses 2 can be processed (Step S24).

Here, during the startup processing of the RAID apparatus, once the linkup of the iSCSI path is completed in above-described Step S23, target information obtainment requests from the host apparatuses 2 can be processed. After the CA becomes the ready state in Step S24, read/write request commands sent from the host apparatuses 2 are processed.

In each host apparatus 2, the linkup of the iSCSI path in the above-described Step S23 is detected and a target information obtainment request is made for the RAID apparatus. If multiple host apparatuses are connected to the RAID apparatus, a target information obtainment request is sent from each of the host apparatuses 2. In the storage system 1 of the present third embodiment, CA information 402 is generated for the first target information obtainment request sent from a host apparatus 2, and generation of CA information is blocked for the second and subsequent target information obtainment requests until the CA becomes ready in Step S24. In other words, the processing for generating the CA information 402 is performed less frequently.

Specific state 2: The storage apparatus 10 cannot process disk access commands sent from the host apparatuses 2.

The configuration information is frequently modified in the storage apparatus 10 during the startup processing. Thus, it is not efficient for the CM 30 to generate CA information 402 during startup processing every time a configuration modification notification is received. Accordingly, generation of CA information 402 is blocked until the storage apparatus 10 becomes capable of processing commands sent from the host apparatuses 2.

It should be noted that the determination as of whether the storage apparatus 10 becomes capable of processing commands sent from the host apparatuses 2 can be made by detecting a Ready notification from certain components in the storage apparatus 10, such as all CAs 300, for example.

Specific state 3: The storage apparatus 10 suspends functioning (the storage apparatus 10 is in the suspended state)

When the storage apparatus 10 is in the suspended state, commands sent from the host apparatuses 2 are received, but the received commands are stored in a buffer memory (not illustrated) in a CA 300 waiting for being processed. In other words, the received commands are blocked at the entry of the CA 300, and the processing of the commands is suspended.

Figure 13:
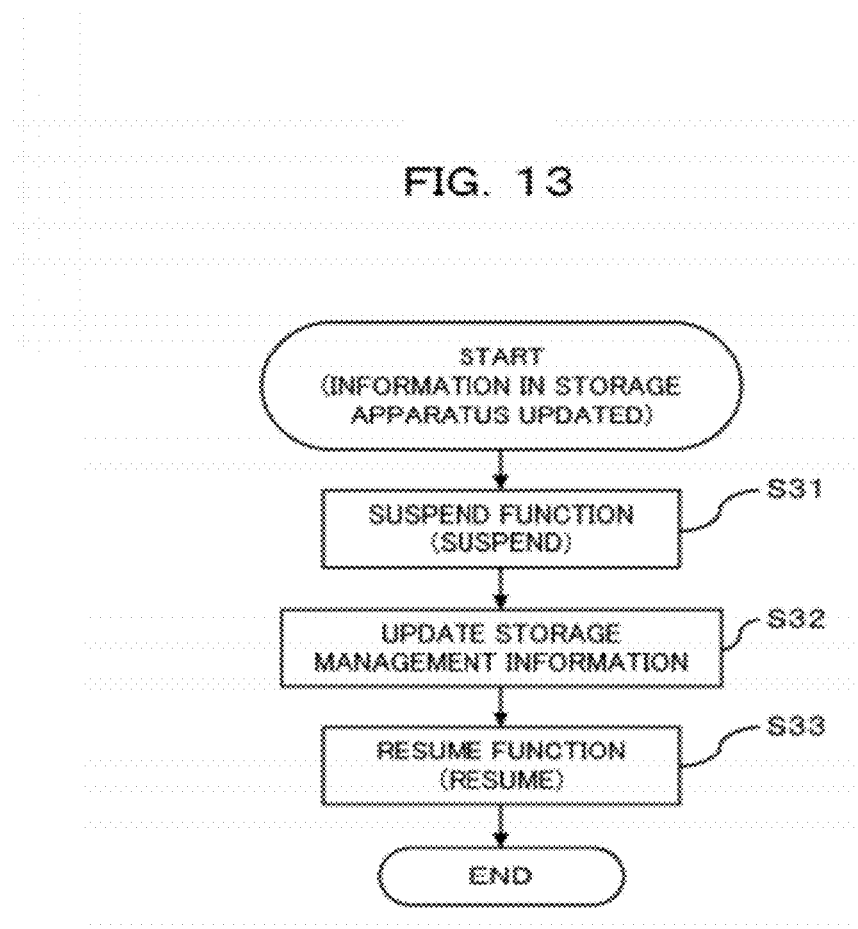
FIG. 13 is a flowchart illustrating one example of processing when information in an RAID apparatus is modified in the RAID apparatus.

FIG. 13 is a flowchart (Steps S31 to S33) illustrating one example of processing when information in an RAID apparatus is modified in the RAID apparatus.

When information in the RAID apparatus is modified, the RAID apparatus suspends the functions (Step S31). Thereafter, after the storage management information 401 is updated (Step S32), the RAID apparatus resumes functioning (Step S33). After the resume, processing of the waited commands become possible and the commands are processed.

The update of the storage management information 401 in Step S32 may cause the CA information 402 to be updated. That is, until the RAID apparatus is resumed from the suspended state, the storage management information 401 is updated in the CM 30, causing update of the CA information 402. Thus, in the suspended state, it is not efficient for the CM 30 to generate CA information 402 every time a configuration modification notification is received. Accordingly, generation of CA information 402 is blocked until the storage apparatus 10 becomes capable of processing commands sent from the host apparatuses 2.

The generation prevention section 22 blocks the notification information generation section 12 from generating CA information 402. If the specific state determination section 21 determines that the storage apparatus 10 is any of the specific states, the generation prevention section 22 blocks the notification information generation section 12 from generating the CA information 402. Specifically, the generation prevention section 22 sets a flag indicating that generation of CA information 402 is to be blocked, in a predetermined region in the RAM 302 and the like, for example. The notification information generation section 12 does not generate CA information 402 when this flag is set. It should be noted that the generation prevention section 22 may use some other more forceful techniques to block the notification information generation section 12 from generating CA information, and various modification may be made.

A processing sequence in the storage system 1 as one example of the third embodiment configured as described above will be described with reference to the flowchart depicted in FIG. 14 (Steps S41 to S45). In the example depicted in FIG. 14, the specific state determination section 21 determines whether the specific states 1 and 2 described above are brought about.

During the startup processing of the storage apparatus 10, in response to receiving a target information obtainment request from a host apparatus 2, the specific state determination section 21 determines whether that target information obtainment request is the first target information obtainment request received during the startup processing (Step S41). If the target information obtainment request is the first request (the YES route from Step S41), the CA information generation section 12 generates CA information 402 including target information about all of the CAs 300 in the storage apparatus 10, from the storage management information 401 (Step S42).

Then, the certain condition determination unit 21 determines whether the storage apparatus 10 can process disk access commands from the host apparatuses 2 (Step S43). If the storage apparatus 10 can process disk access commands from the host apparatuses 2 (the YES route from Step S43), the CA information generation section 12 generates CA information 402 including target information about all of the CAs 300 in the storage apparatus 10, from the storage management information 401 (Step S44).

Thereafter, the generated CA information 402 is sent to the host apparatus 2 by the CA information transmission section 14 or the division transmission section 16 (Step S45), and the processing is terminated.

Otherwise, if the target information obtainment request is the second or subsequent request (the NO route from Step S41), the generation prevention section 22 blocks generation of CA information 402 by CA information generation section 12 and the flow transitions to Step S43. Similarly, if the storage apparatus 10 cannot process disk access commands from the host apparatuses 2 (the NO route from Step S43), the generation prevention section 22 blocks generation of CA information 402 by CA information generation section 12 and the flow transitions to Step S45.

Next, another processing sequence in the third embodiment as one example of the storage system 1 will be described with reference to the flowchart depicted in FIG. 15 (Steps S41 to S45, S51, and S52). In the example depicted in FIG. 15, the specific state determination section 21 determines the specific states 1 to 3 described above.

Note that descriptions of the steps having the same reference symbols in the drawings as the steps described previously will be emitted since they refer to the same or substantially the same processing set forth previously.

During the startup processing of the storage apparatus 10, in response to receiving a target information obtainment request from a host apparatus 2, the specific state determination section 21 determines whether the storage apparatus 10 is in the suspended state (Step S51). If the storage apparatus 10 is not in the suspended state (the NO route from Step S51), the CA information generation section 12 generates CA information 402 including target information about all of the CAs 300 in the storage apparatus 10, from the storage management information 401 (Step S52).

Thereafter, the generated CA information 402 is sent to the host apparatus 2 by the CA information transmission section 14 or the division transmission section 16 (Step S45), and the processing is terminated.

On the other hand, if the storage apparatus 10 is in the suspended state (the YES route from Step S51), the generation prevention section 22 blocks generation of CA information 402 by CA information generation section 12 and the flow transitions to Step S45.

As described above, in accordance with the storage system 1 as one example of the third embodiment, if the specific state determination section 21 determines that one specific state is brought about during the startup processing of the storage apparatus 10, the generation prevention section 22 blocks generation of CA information 402 by the CA information generation section 12. This can eliminate generation of CA information 402 that is highly probably unnecessary, thereby reducing the load during the startup processing of the storage apparatus 10.

Figure 14:
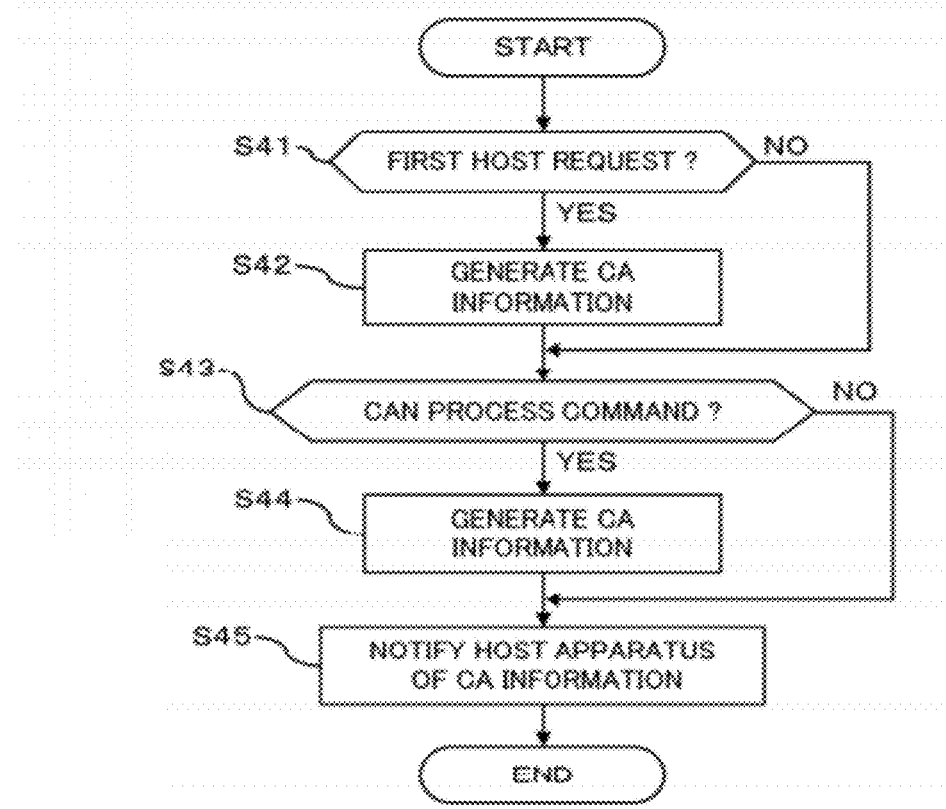
FIG. 14 is a flowchart illustrating a processing sequence in the storage system as one example of the third embodiment storage apparatus.
Figure 15:
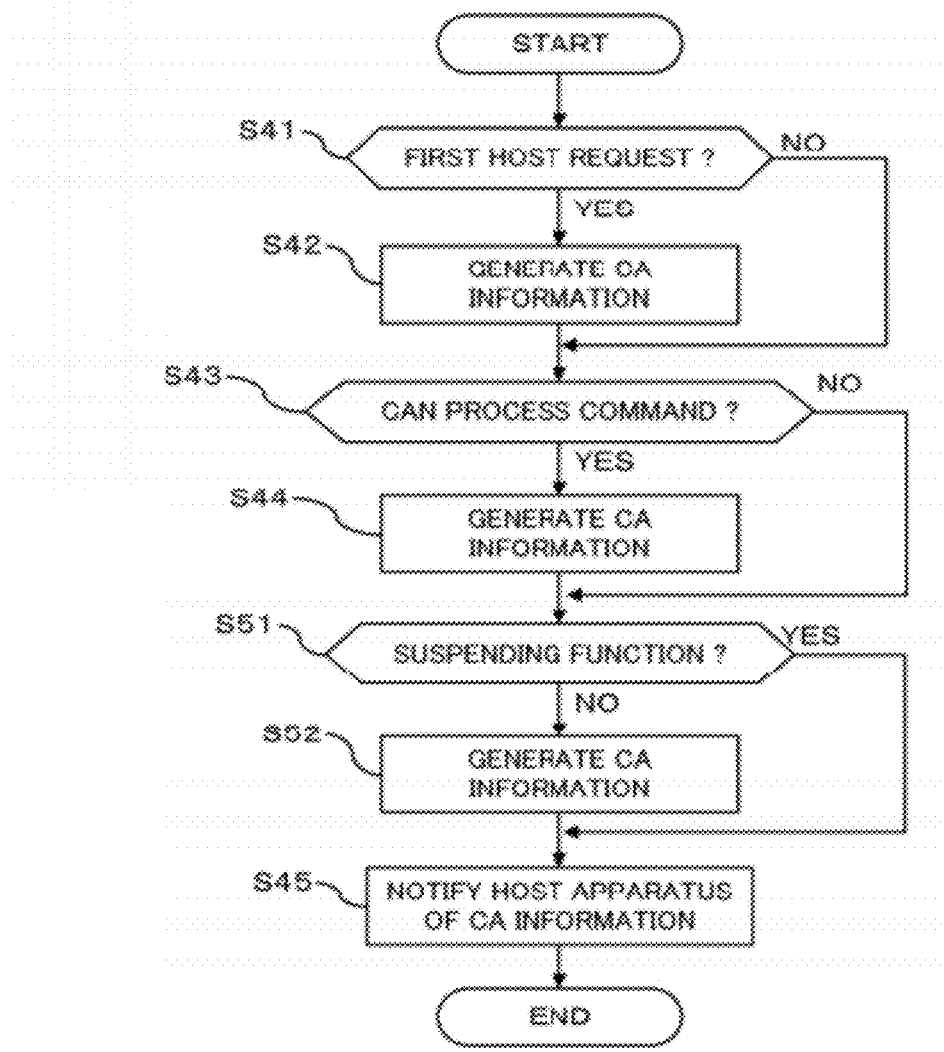
FIG. 15 is a flowchart illustrating another processing sequence in the storage system as one example of the third embodiment storage apparatus.

It should be noted that although the CA information generation section 12 generates CA information 402 every time the specific state determination section 21 determines that one of the specific states 1 to 3 is brought about in the flowcharts depicted in FIGS. 14 and 15, this is not limiting.

For example, the specific state determination section 21 may block generation of CA information 402 by the CA information generation section 12 when it is determined any of the specific states 1 to 3 is brought about. In other words, CA information 402 may be generated only after it is determined that at least two of the specific states 1 to 3 are not brought about.

Figure 16:
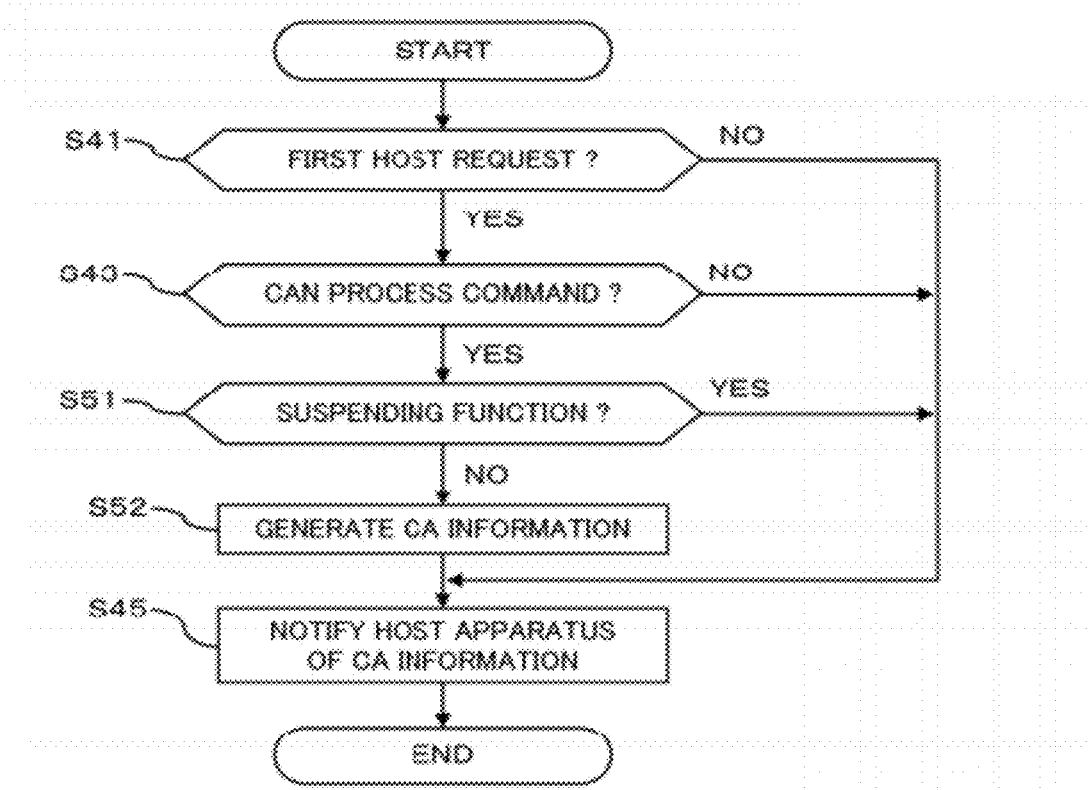
FIG. 16 is a flowchart illustrating a modification to the storage system as one example of the third embodiment.

FIG. 16 is a flowchart illustrating a modification to the storage system 1 as one example of the third embodiment.

In the example depicted in FIG. 16, the specific state determination section 21 blocks generation of CA information 402 by the CA information generation section 12 when it is determined that any of the specific states is brought about in one of the specific state determination steps in Step S41, S43, and S51. In other words, CA information 402 is generated only after it is determined that no specific state is brought about in all of the specific state determination steps Step S41, S43, and S51.

This can make generation of CA information 402 by the CA information generation section 12 more infrequent, thereby further reducing the processing load during startup of the storage apparatus 10.

(D) Description of Fourth Embodiment

A storage system 1 of a fourth embodiment also includes a storage apparatus 10 and provides one or more host apparatuses 2 communicably connected to the storage system 1 by means of the iSCSI, with storage regions, as in the first embodiment.

(D-1) Description of First Mode

Figure 17:
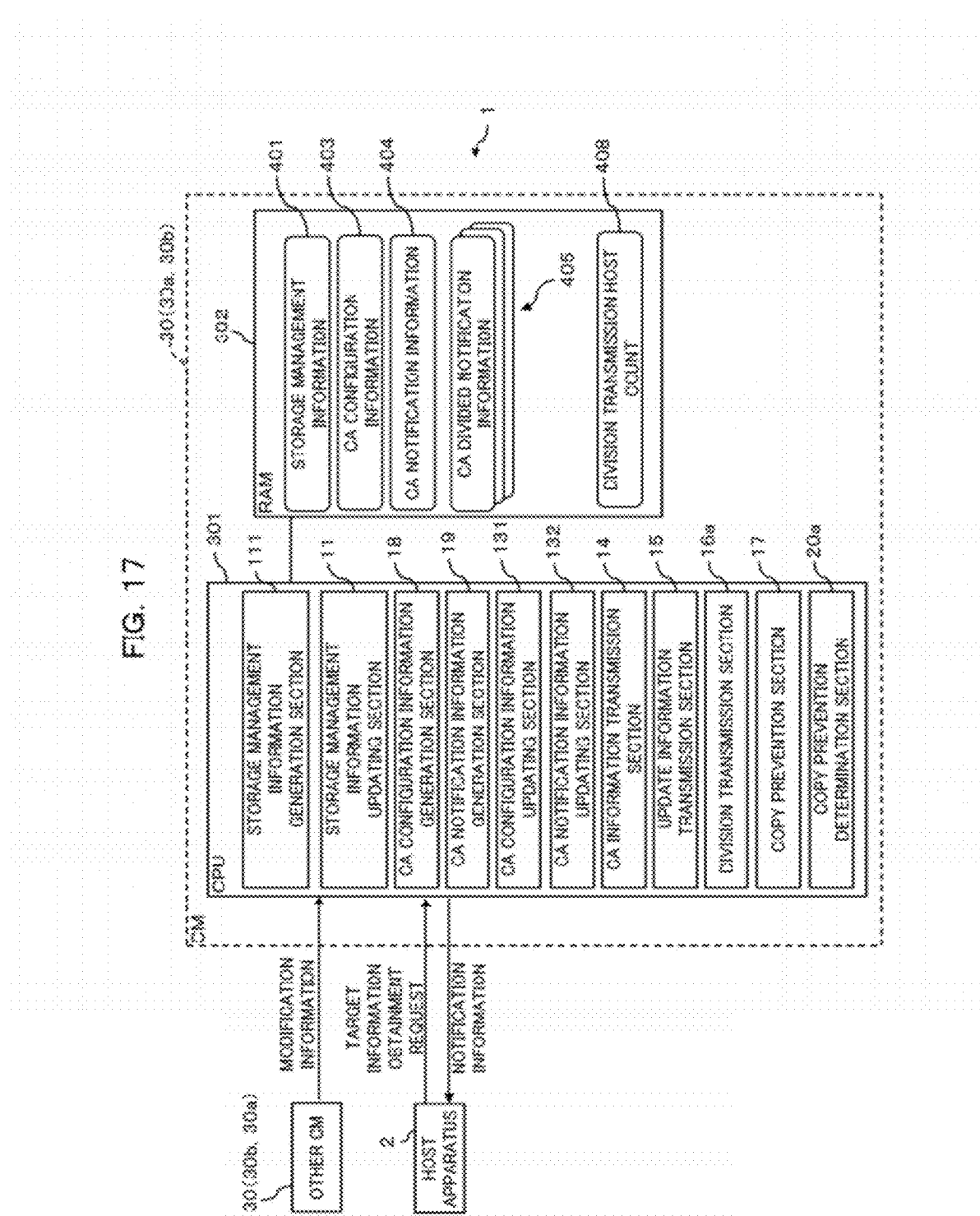
FIG. 17 is a diagram schematically illustrating a functional configuration of a CM provided in a storage system as one example of a fourth embodiment.
Figure 18:
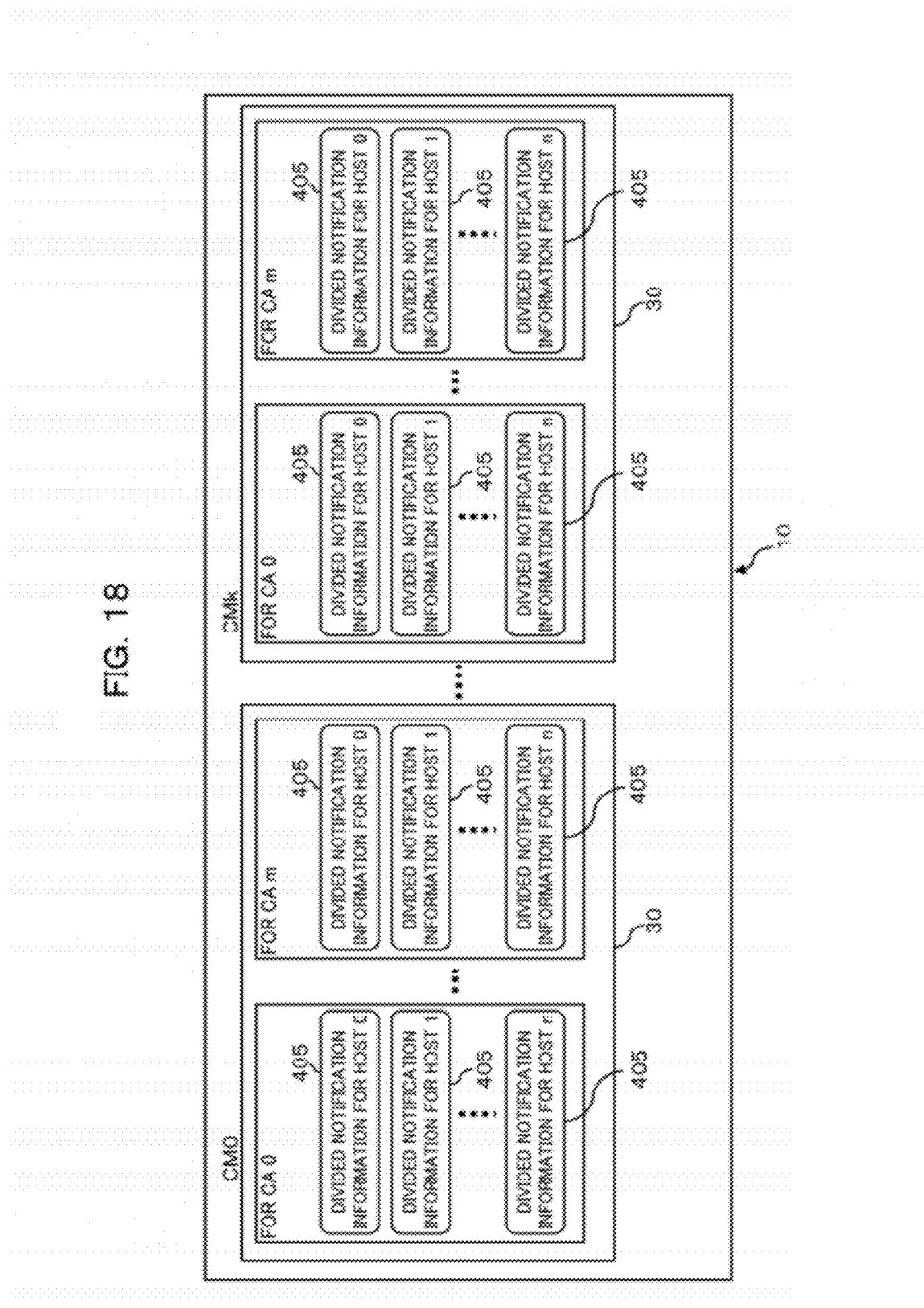
FIG. 18 is a diagram illustrating how divided notification information is stored in the storage system as one example of the first mode of the fourth embodiment.

FIG. 17 is a diagram schematically illustrating a functional configuration of a CM provided in a storage system 1 as one example of a first mode of the fourth embodiment, and FIG. 18 is a diagram illustrating how divided notification information is stored therein.

As depicted in FIG. 17, the storage system 1 as one example of the first mode of the fourth embodiment has functions as a division transmission section 16a and a copy prevention determination section 20a, in place of the division transmission section 16 and the copy prevention determination section 20 in the storage system 1 of the second embodiment depicted in FIG. 5. Other components are similarly configured as those in the storage system 1 of the second embodiment.

The storage system 1 of the present fourth embodiment has the hardware configuration similar to that in the storage system 1 of the second embodiment depicted in FIGS. 5 and 6. In other words, the CPU 301 functions as a storage management information generation section 111, a storage management information updating section 11, a CA configuration information generation section 18, a CA notification information generation section 19, a CA configuration information updating section 131, a CA notification information updating section 132, a CA information transmission section 14, an update information transmission section 15, a division transmission section 16a, a copy prevention section 17, and a copy prevention determination section 20a.

Further, in the storage system 1 as one example of the first mode of the present fourth embodiment, as depicted in FIG. 5, the RAM 302 includes storage management information 401, CA configuration information 403, CA notification information 404, divided notification information 405, and division transmission host count information 408.

Note that descriptions of the elements having the same reference symbols in the drawings as the elements described previously will be emitted since they refer to the same or substantially the same elements set forth previously.

The division transmission section 16a divides the CA notification information 404 into the multiple pieces of divided notification information 405, and sends the multiple pieces of divided notification information 405 to the host apparatus 2 one by one (division transmission). That is, the division transmission section 16a also functions as a divided notification information generation section that generates multiple pieces of divided notification information 405 based on the CA notification information 404.

Also in the present fourth embodiment, the CPU 301 (division determination unit) compares the data size of the CA notification information 404 with a predetermined reference value. If the data size of the CA notification information 404 is greater than the reference value, the CA information transmission section 14 does not send the CA notification information 404. Instead, pieces of divided notification information 405 are generated by the division transmission section 16 and the pieces of divided notification information 405 are sent to the host apparatus 2.

The generated divided notification information 405 is stored in a predetermined region 3405 in the RAM 302, as depicted in FIG. 6. In other words, the RAM 302 functions as a divided notification information storage section that stores the divided notification information 405.

In the first mode of the present fourth embodiment, as depicted in FIG. 18, the division transmission section 16a generates divided notification information 405 for each host apparatus 2 and each CA 300. In the example depicted in FIG. 18, in each CM 30, divided notification information 405 corresponding to each host apparatus 2 is generated for each CA 300.

In the example depicted in FIG. 18, "k" represents the number of CMs 30 in the storage apparatus 10, "n" represents the number of host apparatuses 2 connected to the storage apparatus 10, and "m" represents the number of CAs 300 provided in a single CM 30, where "k", "n", "m" are natural numbers.

The processing by the storage system 1 as one example of the first mode of the fourth embodiment configured as described above during a division transmission will be described with reference to the sequence diagram depicted in FIG. 19. It should be noted that in the example depicted in FIG. 19, pieces of divided notification information 405 are sent for respective target information obtainment requests to the storage apparatus 10 made from two host apparatuses 2 denoted as hosts 1 and 2.

When an obtainment request for target information is made from the host 1 to the storage apparatus 10 (see the reference symbol C1), in the storage apparatus 10, the CA notification information generation section 19 (or the CA notification information updating section 132) generates (or updates) CA notification information 404 (see the reference symbol C2). The division transmission section 16a generates pieces of divided notification information 405 for the host 1 (divided notification information for the host 1) based on the CA notification information 404, and sends a piece to the host 1 (see the reference symbol C3).

The generated divided notification information 405 is stored in a predetermined storage region in the RAM 302 and the like, with being related to information for identifying the CA 300 that received the target information obtainment request and information for identifying the host apparatus 2 that sent the target information obtainment request (see the reference symbol C4).

Figure 19:
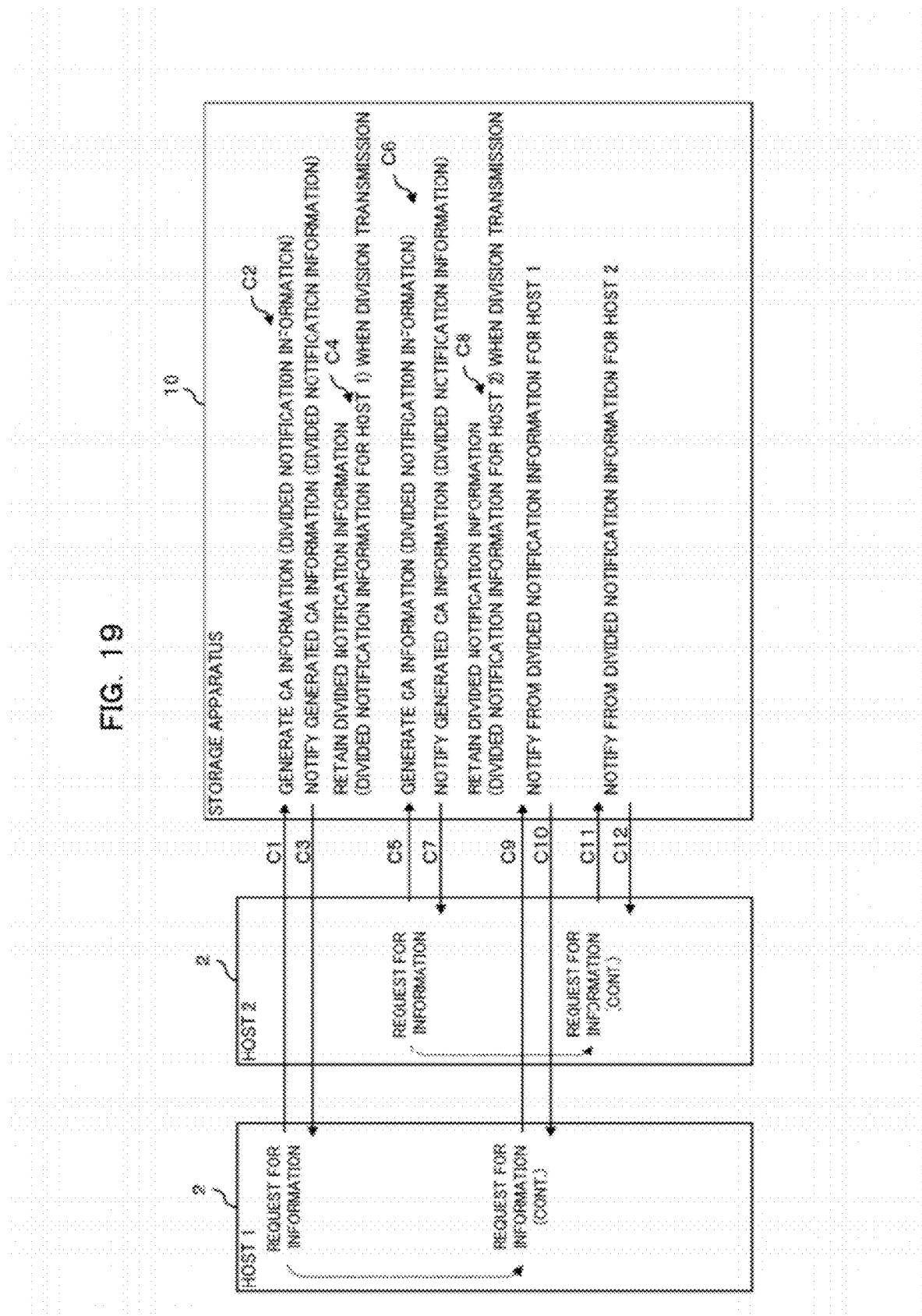
FIG. 19 is sequence diagram illustrating processing in the storage system as one example of the first mode of the fourth embodiment during a division transmission.

It should be noted in the example depicted in FIG. 19, the CA notification information 404 is divided into two pieces of divided notification information 405, which are sent. In this example, transmission is made from the storage apparatus 10 to the host 1. Further, each piece of the divided notification information 405 is appended with a continue bit indicating that the data is divided and a subsequent piece of data is present, and an identifier for identifying the subsequent piece of data, for example.

Next, when an obtainment request for target information is made from the host 2 to the storage apparatus 10 (see the reference symbol C5), in the storage apparatus 10, the CA notification information generation section 19 (or the CA notification information updating section 132) generates (updates) CA notification information 404 (see the reference symbol C6). The division transmission section 16a generates pieces of divided notification information 405 for the host 2 (divided notification information for the host 2) based on the CA notification information 404, and sends a piece to the host 2 (see the reference symbol C7).

The generated divided notification information 405 is stored in a predetermined storage region in the RAM 302 and the like, with being related to information for identifying the CA 300 that received the target information obtainment request and information for identifying the host apparatus 2 that sent the target information obtainment request (see the reference symbol C8).

Thereafter, a piece of divided notification information 405 subsequent to the piece of divided notification information 405 notified in the step indicated by the reference symbol C3 is requested to the storage apparatus 10 by the host 1 (see the reference symbol C9). In response to the obtainment request, the subsequent piece of divided notification information 405 stored in the RAM 302 is sent from the storage apparatus 10 (see the reference symbol C10).

Further, a piece of divided notification information 405 subsequent to the piece of divided notification information 405 notified in the step indicated by the reference symbol C5 is also requested to the storage apparatus 10 by the host 2 (see the reference symbol C11). In response to the obtainment request, the subsequent piece of divided notification information 405 stored in the RAM 302 is sent from the storage apparatus 10 (see the reference symbol C12).

Thereafter, the storage apparatus 10 responses to information obtainment requests from each host apparatus 2 in the similar manner.

As described above, in accordance with the storage system as one example of the first mode of the fourth embodiment 1, when a target information obtainment request is made from a host apparatus 2, multiple pieces of divided notification information 405 generated based on the CA notification information 404 are stored in the predetermined region 3405 in the RAM 302. Then, for a (subsequent) target information obtainment request from the host apparatus 2, the divided notification information 405 that is stored is read and sent.

Thereby, even if the configuration of any CA 300 in the storage apparatus 10 is modified until a subsequent piece of divided notification information 405 is sent after the previous piece(s) of divided notification information 405 is sent, no inconsistency arises, in cases of a division response where the pieces of divided notification information 405 are sent to the host apparatus 2. That is, consistency is ensured between piece(s) of divided notification information 405 sent previously and piece (s) of divided notification information 405 sent subsequently, which improves the reliability.

(D-2) Description of Second Mode

Figure 20:
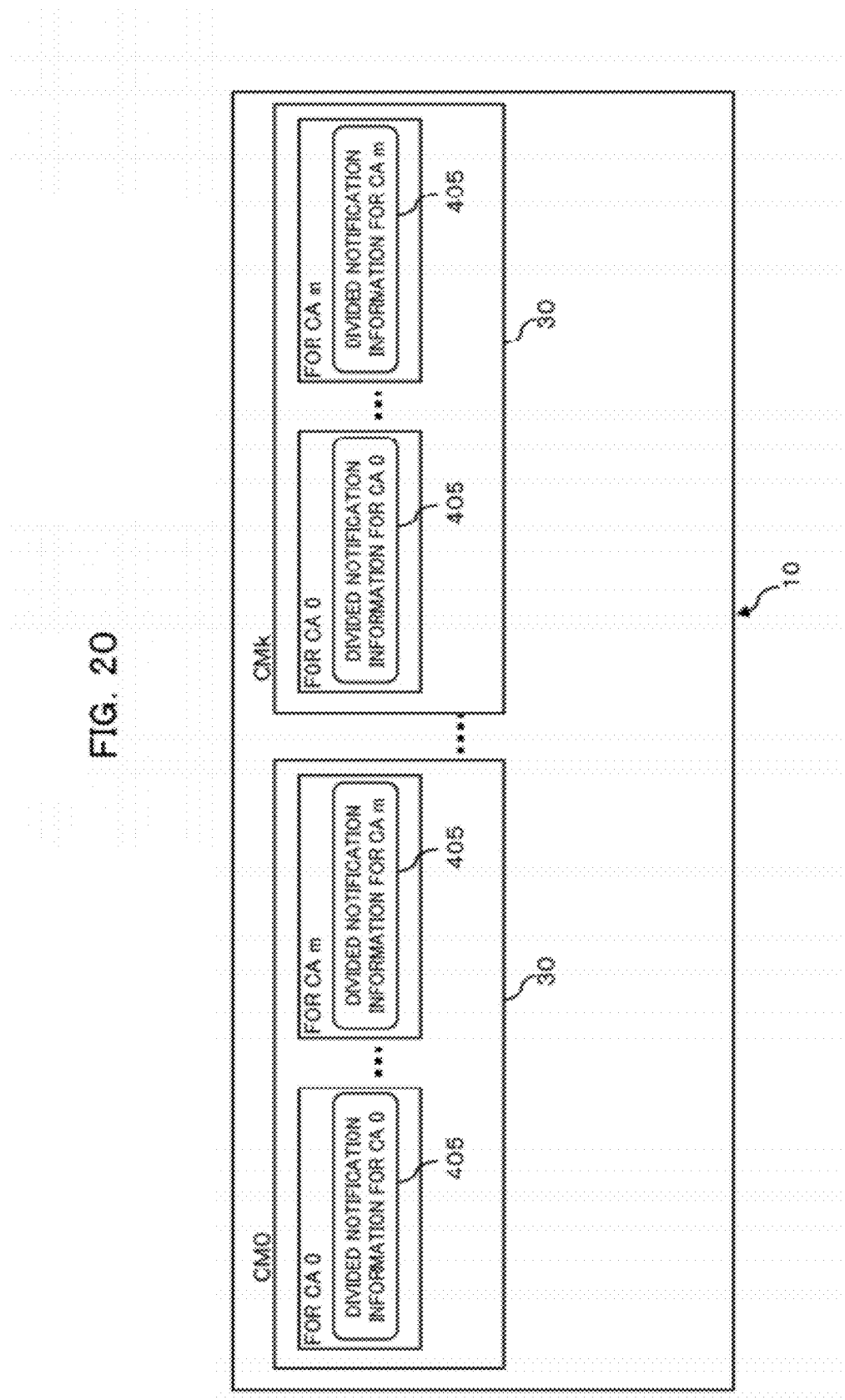
FIG. 20 is a diagram illustrating how divided notification information is stored in a storage system as one example of a second mode of the fourth embodiment.

FIG. 20 is a diagram illustrating how divided notification information is stored in the storage system 1 as one example of a second mode of the fourth embodiment.

The storage system 1 of the second mode of the present forth embodiment has the hardware configuration similar or substantially similar to that in the storage system 1 of the first mode described above, and any detailed description thereon will be omitted.

In the storage system 1 of the second mode of in the present fourth embodiment, as depicted in FIG. 20, divided notification information 405 generated by the division transmission section (divided notification information generation section) 16a is maintained for each CA 300. In the example depicted in FIG. 20, divided notification information 405 is retained for each CA 300 in each CM 30. In other words, a single region for storing divided notification information 405 is provided for each CA 300 in the RAM 302.

In the present second mode, divided notification information 405 is provided for each CA 30, and in each CA 300, update of CA information (notification information) is blocked while divided notification information 405 is being sent to a host apparatus 2 (during a division transmission).

The functions other than storage and management of divided notification information 405 are configured similarly or substantially similarly to those in the above-described first mode of the fourth embodiment, and any detailed description thereof will be omitted.

The processing by the storage system 1 as the second mode of the fourth embodiment configured as described above during a division transmission will be described with reference to the sequence diagram depicted in FIG. 21. It should be noted that in the example depicted in FIG. 21, pieces of divided notification information 405 are sent for respective target information obtainment requests to the storage apparatus 10 made from three host apparatuses 2 denoted as hosts 1 to 3.

When the first obtainment request for target information is made from the host 1 to the storage apparatus 10 (see the reference symbol D1), in the storage apparatus 10, the CA notification information generation section 19 (or the CA notification information updating section 132) generates (or updates) CA notification information 404 (see the reference symbol D2). The division transmission section 16a generates pieces of divided notification information 405 for the host 1 (divided notification information for the host 0) based on the CA notification information 404, and sends the first piece of divided notification information 405 to the host 1 (see the reference symbol D3).

Further, the generated divided notification information 405 is stored in the region 3405 in the RAM 302, with being related to the CA 0 that received the target information obtainment request (see the reference symbol D4).

Figure 21:
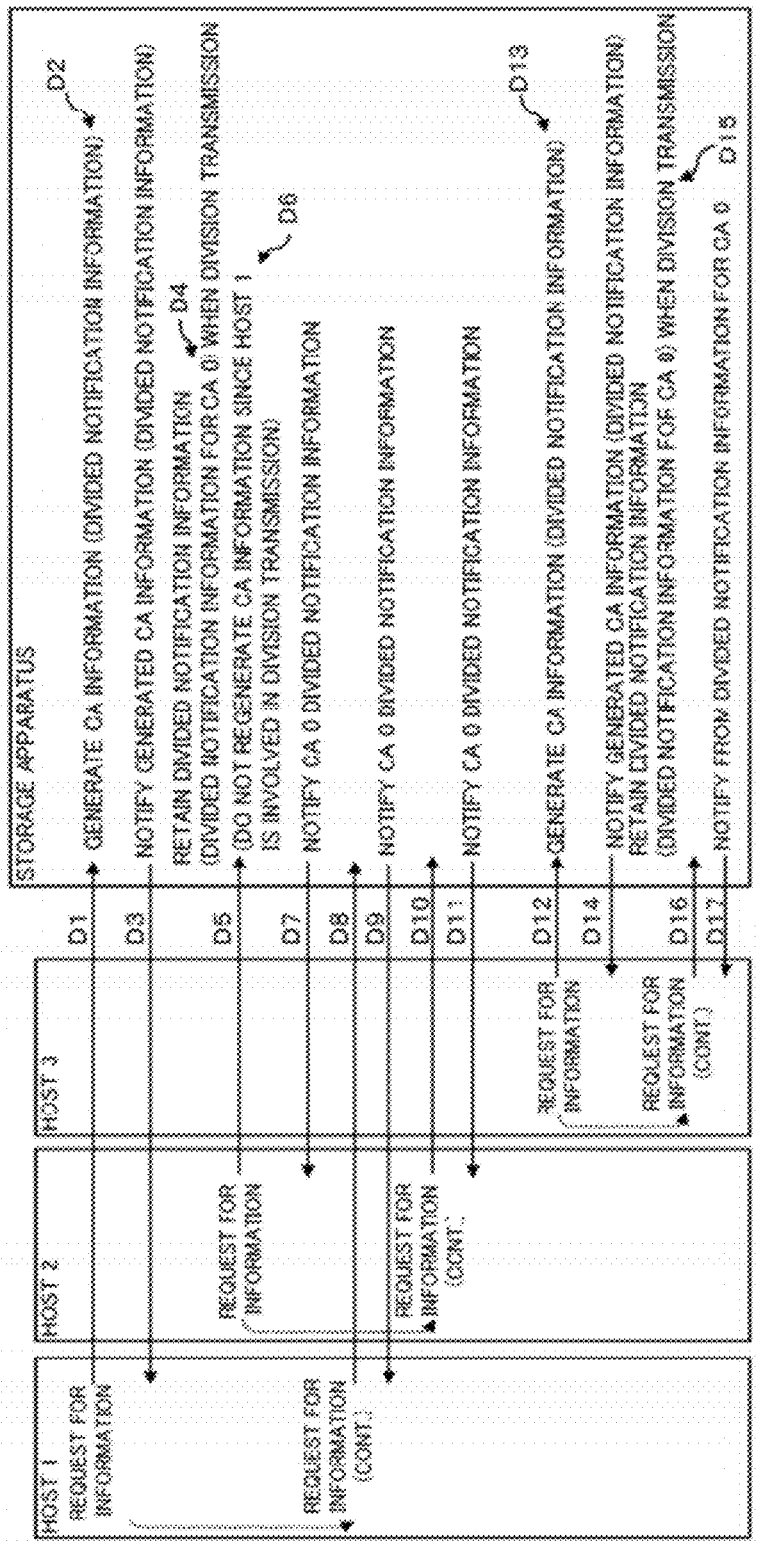
FIG. 21 is sequence diagram illustrating processing in the storage system as the second mode of the fourth embodiment during a division transmission.

It should be noted in the example depicted in FIG. 21, the CA notification information 404 is divided into two pieces of divided notification information 405, which are sent. Further, each piece of the divided notification information 405 is appended with a continue bit indicating that the data is divided and a subsequent piece of data is present, and an identifier for identifying the subsequent piece of data, for example.

Next, when an obtainment request for target information is made from the host 2 to the storage apparatus 10 (see the reference symbol D5), the CA notification information generation section 19 does not regenerate CA notification information 404 since the division transmission of the divided notification information 405 is being carried out to the host 1 at this point in time (see the reference symbol D6). That is, the divided notification information 405 for the CA 0 generated in the step indicated by the reference symbol D2 is sent to the host 2 (see the reference symbol D7).

Thereafter, a piece of divided notification information 405 subsequent to the piece of divided notification information 405 notified in the step indicated by the reference symbol D3 is requested to the storage apparatus 10 by the host 1 (see the reference symbol D8). In response to the obtainment request, the subsequent piece of divided notification information 405 stored in the RAM 302 is sent from the storage apparatus 10 (see the reference symbol D9).

Further, a piece of divided notification information 405 subsequent to the piece of divided notification information 405 notified in the step indicated by the reference symbol D5 is also requested to the storage apparatus 10 by the host 2 (see the reference symbol D10). In response to the obtainment request, the subsequent piece of divided notification information 405 stored in the RAM 302 is sent from the storage apparatus 10 (see the reference symbol D11).

Then, when an obtainment request for target information is also made from the host 3 to the storage apparatus 10 (see the reference symbol D12), the division transmission processing in the hosts 1 and 2 has already completed and no division transmission is being carried out at this point in time. Accordingly, the CA notification information generation section 19 generates CA notification information 404 (see the reference symbol D13). The division transmission section 16a generates pieces of divided notification information 405 for the host 3 (divided notification information for the host 0) based on the CA notification information 404, and sends the first piece of divided notification information 405 to the host 3 (see the reference symbol D14).

Further, the generated divided notification information 405 is stored in the region 3405 in the RAM 302, with being related to the CA 0 that received the target information obtainment request (see the reference symbol D15).

Then, a piece of divided notification information 405 subsequent to the piece of divided notification information 405 notified in the step indicated by the reference symbol D12 is requested to the storage apparatus 10 by the host 3 (see the reference symbol D16). In response to the obtainment request, the subsequent piece of divided notification information 405 stored in the RAM 302 is sent from the storage apparatus 10 (see the reference symbol D17).

Thereafter, the storage apparatus 10 responses to information obtainment requests from each host apparatus 2 in the similar manner.

Figure 22:
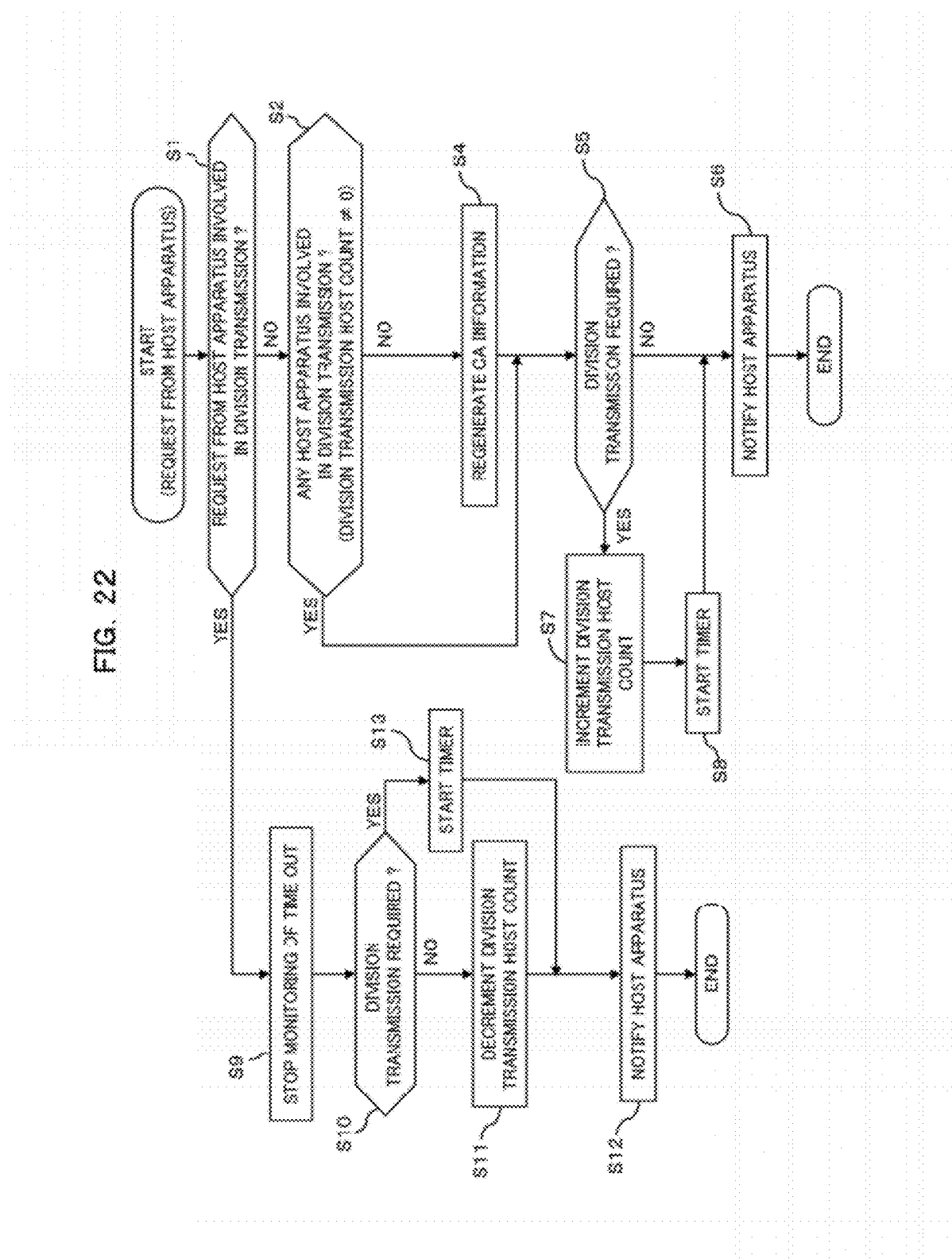
FIG. 22 is a flowchart illustrating processing by a CM in the storage system of the second mode of the fourth embodiment storage apparatus.
Figure 23:
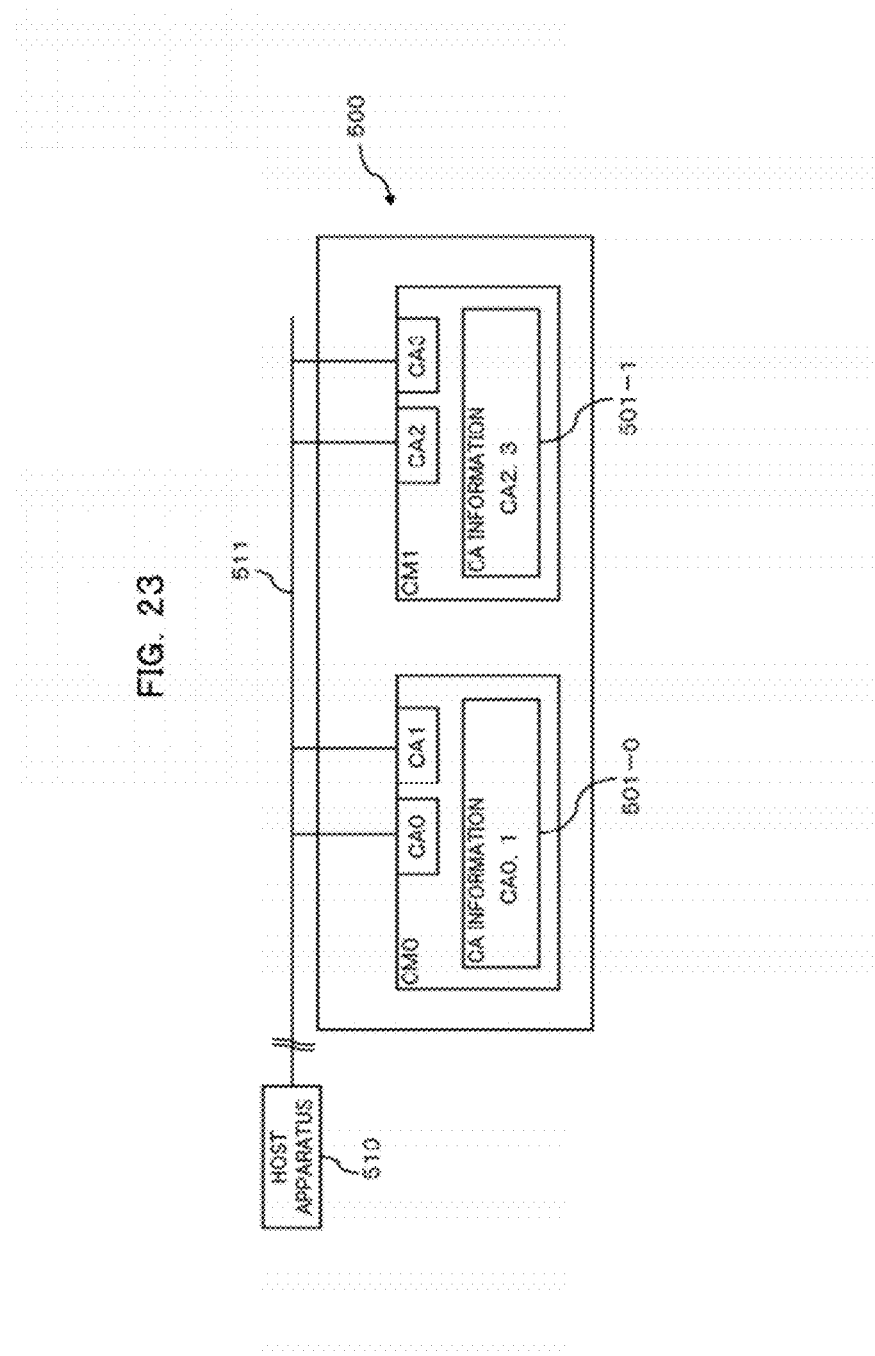
FIG. 23 is a diagram schematically illustrating a configuration of a conventional storage apparatus.
Figure 24:
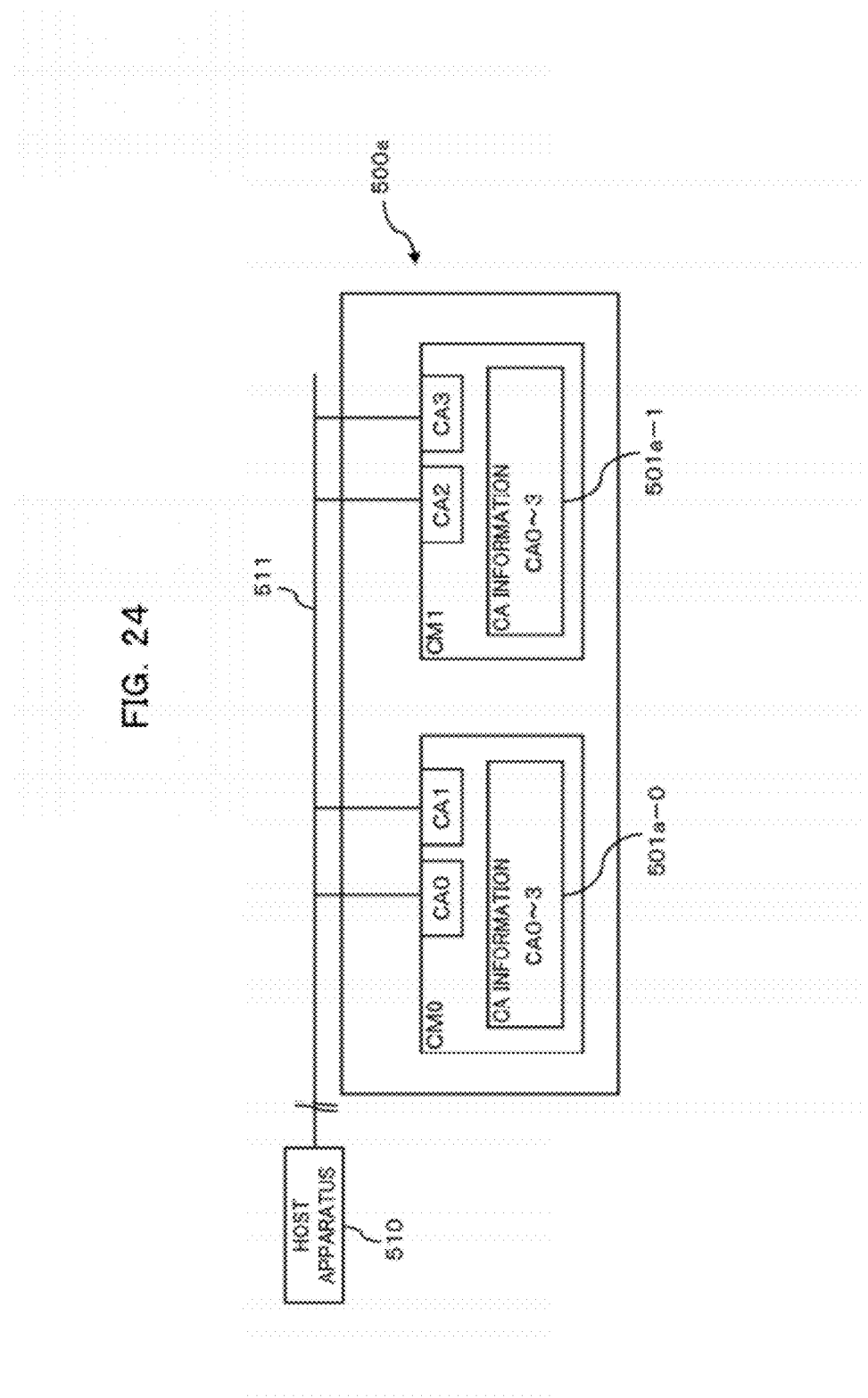
FIG. 24 is a diagram schematically illustrating a hardware configuration of an RAID apparatus.
Figure 25:
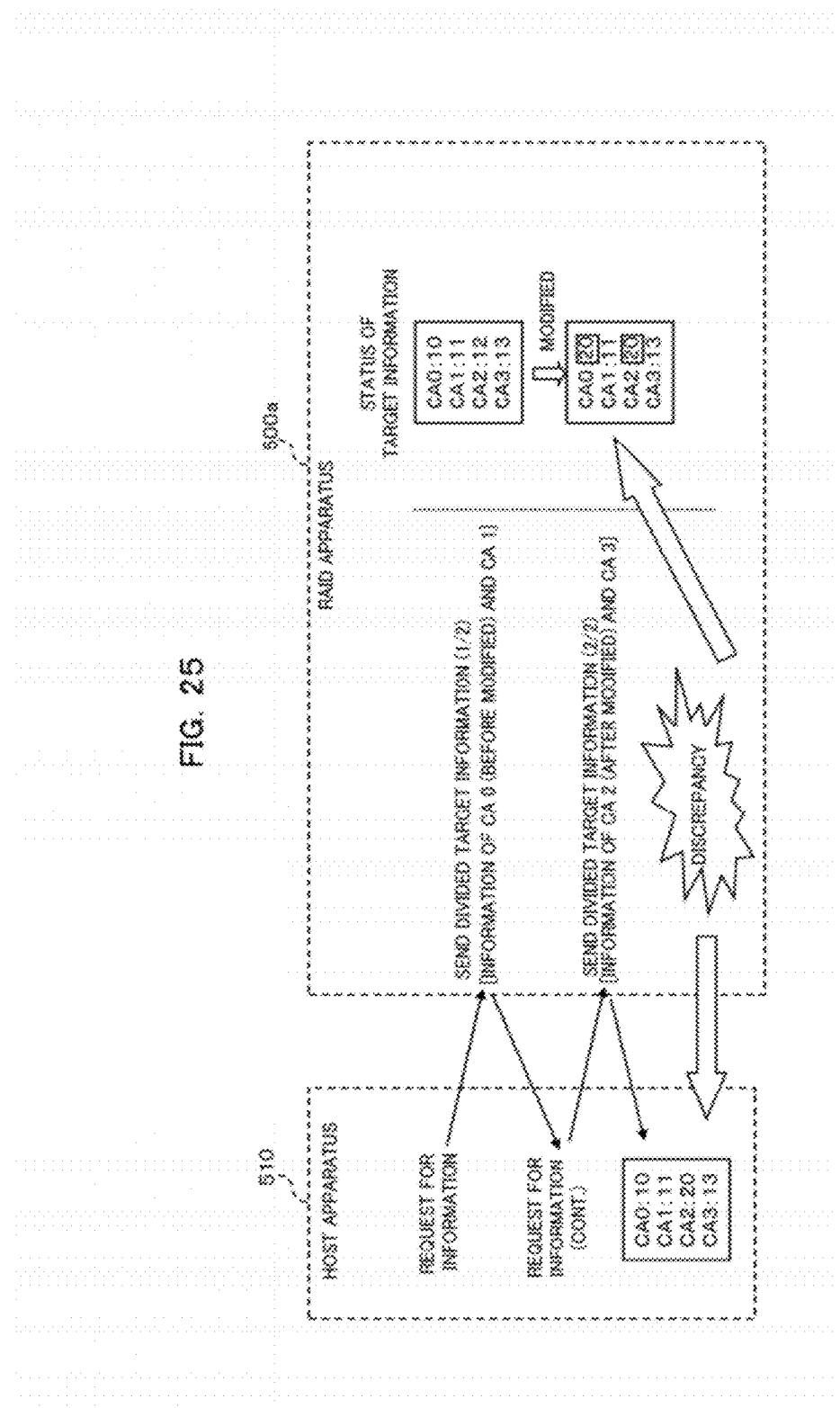
FIG. 25 is a diagram illustrating the situation wherein a configuration is modified in an RAID apparatus during a division transmission of target information.

Next, processing by a CM 30 in the storage apparatus 10 in this storage system 1 of the second mode of the present fourth embodiment will be described with reference to the flowcharts depicted in FIGS. 22 and 10 (Steps S1, S2, and S4 to S13 in FIG. 22 and Step S14 in FIG. 10). The flowchart depicted in FIG. 22 is similar to the flowchart depicted in FIG. 9 except that Step S3 in the flowchart in FIG. 9 is omitted, and the description thereof will be omitted.

As described above, in the storage system 1 of the second mode of in the present fourth embodiment, generation of CA notification information 404 by the CA notification information generation section 19 is blocked during a division transmission, and divided notification information 405 for the CA 0 generated in response to a target information obtainment request from a host apparatus 2 is sent to that host 2. Thereby, even if the configuration of any CA 300 in the storage apparatus 10 is modified during the division transmission, no inconsistency arises from the configuration modification between pieces of divided notification information 405 sent before the modification and pieces of divided notification information 405 sent after the modification. Thus, the host apparatus 2 does not encounter any error.

Further, in the storage system 1 as one example of the above-described first mode of the fourth embodiment, as depicted in FIG. 18, CA information (divided notification information) corresponding to each host apparatus 2 is stored for each CA 300. In contrast, in present second mode, CA information (divided notification information) is stored for each CA 300.

Here, the size of the storage region in the RAM 302 for storing CA notification information will be estimated using an example with the following configuration:

Size of information per port: 256 bytes
The number of ports: 128 ports
(e.g., the number of CMs: 8; the number of CAs per CM: 16 ports)

The maximum host numbers connectable to each port: 256 hosts For the storage system 1 having the above configuration, the sizes of the storage region in the RAM 302 for storing CA notification information will be estimated.

For the technique of the above-described first mode of the fourth embodiment, the size of the storage region in the RAM 302 required for storing CA notification information 404 per host apparatus 2 is estimated using the following formulae:

$$256\ bytes \times 128\ ports = 32768\ bytes\ (32\ KB)$$

Hence, the total size required for 256 host apparatuses 2 is:

$$32\ KB \times 256 = 8192\ KB$$

The storage region of a size of 8192 KB is required for storing CA notification information 404.

In contrast, in the above-described second mode of the fourth embodiment, CA notification information 404 is stored for each CA 300 (each port). The size of the storage region in the RAM 302 required for storing CA notification information 404 is estimated using the following formula:

$$32\ KB \times 16\ ports = 512\ KB$$

As described above, in accordance with second mode of the present fourth embodiment, the size of the storage region in the RAM 302 required for storing CA notification information 404 can be reduced to 512 KB, which is one sixteenth of 8192 KB in the first mode.

(E) Others

The disclosed technique is not limited to the embodiments described above, and various modifications may be made without departing from the spirit of the present embodiments. The configurations and processes of the present embodiments may be selected or suitably combined where necessary.

The embodiments and forms described above may be practiced or manufactured by those ordinally skilled in the art with reference to the above disclosure.

The disclosed technique may provide at least one of the following advantageous effects or advantages:

(1) Target information about all of communication adaptors provided in a storage apparatus can be sent to a host apparatus in a simplified manner.

(2) The load for notifying notification information to a host apparatus can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage apparatus comprising a storage for storing data and a plurality of communication adaptors being connected to a host apparatus, the storage apparatus comprising a processor and a memory, wherein the processor:

stores first notification information including target information about all of the communication adaptors in the storage apparatus, in the memory;

generates second notification information by copying the first notification information;

stores the second notification information in the memory;

updates the first notification information stored in the memory, upon configuration information on the communication adaptors being modified;

updates, in response to receiving a target information obtainment request from the host apparatus, the second notification information stored in the memory with second notification information generated by copying the first notification information;

determines whether a status of the storage apparatus meets a predetermined copy prevention condition;

blocks, if the determination is made that the status of the storage apparatus matches the predetermined copy prevention condition, the copy of the first notification information to the second notification information; and sends, in response to receiving the target information obtainment request from the host apparatus, the second notification information stored in the memory to the host apparatus.

2. The storage apparatus according to claim 1, wherein the copy prevention condition is that a count of update to the first notification information matches a count of update to the second notification information.

3. The storage apparatus according to claim 1, wherein the processor further divides, in response to receiving an information obtainment request from the host apparatus, the second notification information into a plurality of pieces of divided notification information, and sends the plurality of pieces of divided notification information to the host apparatus one by one, wherein the copy prevention condition is that the plurality of pieces of divided notification information are being sent to the host apparatus.

4. A controller comprising one or more communication adaptors being connected to a host apparatus and connected to a storage for storing data, the controller comprising a processor and a memory, wherein the processor:

stores first notification information including target information about all of the communication adaptors in the storage apparatus, in the memory;

generates second notification information by copying the first notification information;

stores the second notification information in the memory;

updates the first notification information stored in the memory, upon configuration information on the communication adaptors being modified;

updates, in response to receiving a target information obtainment request from the host apparatus, the second notification information stored in the memory with second notification information generated by copying the first notification information;

determines whether a status of the storage apparatus meets a predetermined copy prevention condition;

blocks, if the determination is made that the status of the storage apparatus matches the predetermined copy prevention condition, the copy of the first notification information to the second notification information; and sends, in response to receiving the target information obtainment request from the host apparatus, the second notification information stored in the memory to the host apparatus.

5. The controller according to claim 4, wherein the copy prevention condition is that a count of update to the first notification information matches a count of update to the second notification information.

6. The controller according to claim 4, wherein the processor further divides, in response to receiving an information obtainment request from the host apparatus, the second notification information into a plurality of pieces of divided notification information, and sends the plurality of pieces of divided notification information to the host apparatus one by one, wherein the copy prevention condition is that the plurality of pieces of divided notification information are being sent to the host apparatus.

7. A method of controlling a controller comprising one or more communication adaptors being connected to a host apparatus and connected to a storage for storing data, the method comprising:

storing first notification information including target information about all of the communication adaptors in the storage apparatus in a memory;

generating second notification information by copying the first notification information;

storing the second notification information in the memory;

updating the first notification information stored in the memory, upon configuration information on the communication adaptors being modified;

updating, in response to receiving a target information obtainment request from the host apparatus, the second notification information stored in the memory with second notification information generated by copying the first notification information;

determining whether a status of the storage apparatus meets a predetermined copy prevention condition;

blocking, when the determination is made that the copy prevention condition is met, the copy of the first notification information to the second notification information; and sending, in response to receiving the target information obtainment request from the host apparatus, the second notification information stored in the memory to the host apparatus.

8. The method of controlling according to claim 7, wherein the copy prevention condition is that a count of update to the first notification information matches a count of update to the second notification information.

9. The method of controlling according to claim 7, further comprising dividing, in response to receiving an information obtainment request from the host apparatus, the second notification information into a plurality of pieces of divided notification information, and sending the plurality of pieces of divided notification information to the host apparatus one by one, wherein the copy prevention condition is that the plurality of pieces of divided notification information are being sent to the host apparatus.

\* \* \* \* \*